US010375292B2

(12) United States Patent
Park

(10) Patent No.: US 10,375,292 B2
(45) Date of Patent: Aug. 6, 2019

(54) IMAGE PICKUP APPARATUS AND METHOD FOR GENERATING IMAGE HAVING DEPTH INFORMATION

(71) Applicant: SAMSUNG ELECTRONICS CO., LTD., Suwon-si (KR)

(72) Inventor: Kyong-tae Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 14/626,289

(22) Filed: Feb. 19, 2015

(65) Prior Publication Data

US 2015/0264335 A1 Sep. 17, 2015

(30) Foreign Application Priority Data

Mar. 13, 2014 (KR) .................... 10-2014-0029771
Oct. 7, 2014 (KR) .................... 10-2014-0135120

(51) Int. Cl.
*H04N 13/00* (2018.01)
*H04N 5/232* (2006.01)
(Continued)

(52) U.S. Cl.
CPC ....... *H04N 5/23212* (2013.01); *G02B 3/0006* (2013.01); *G02B 7/08* (2013.01);
(Continued)

(58) Field of Classification Search
None
See application file for complete search history.

(56) References Cited

U.S. PATENT DOCUMENTS 8,228,417 B1 7/2012 Georgiev et al.
8,248,515 B2 * 8/2012 Ng ..................... G02B 3/0056
348/343
(Continued)

FOREIGN PATENT DOCUMENTS

CN 101610353 B 10/2011
CN 102282590 A 12/2011
(Continued)

OTHER PUBLICATIONS

Ren, "Digital Light Field Photography", A dissertation submitted to the department of computer science and the committee on graduate studies of Stanford University, Jul. 2006.*
(Continued)

*Primary Examiner* — Mohammad J Rahman
(74) *Attorney, Agent, or Firm* — Sughrue Mion, PLLC

(57) ABSTRACT

Provided are an image pickup apparatus and method capable of improving a resolution of an image having depth information. The image pickup apparatus may include: a main lens configured to refract incident light; an image sensor comprising a plurality of two-dimensional (2D)-arranged pixels configured to output an image signal according to the incident light; a micro lens array between the main lens and the image sensor and comprising a plurality of 2D-arranged micro lenses; and a controller configured to receive the image signal from the image sensor and to generate an image according to the received image signal, wherein the controller is configured to obtain a plurality of images having different depths of field by changing a distance between the main lens and the image sensor and to obtain at least one depth map from the at least one of the obtained plurality of images.

37 Claims, 18 Drawing Sheets

(51) Int. Cl.
| | |
|---|---|
| *G02B 3/00* | (2006.01) |
| *G02B 7/38* | (2006.01) |
| *G02B 27/00* | (2006.01) |
| *G02B 7/08* | (2006.01) |
| *H04N 5/225* | (2006.01) |
| *H04N 13/207* | (2018.01) |
| *H04N 13/271* | (2018.01) |

(52) U.S. Cl.
CPC ............ *G02B 7/38* (2013.01); *G02B 27/0075* (2013.01); *H04N 5/2254* (2013.01); *H04N 13/207* (2018.05); *H04N 13/271* (2018.05)

(56) References Cited

U.S. PATENT DOCUMENTS

| | | | |
|---|---|---|---|
| 8,311,362 B2 | 11/2012 | Tamaru | |
| 8,400,555 B1 | 3/2013 | Georgiev et al. | |
| 8,427,548 B2 | 4/2013 | Lim et al. | |
| 8,970,680 B2* | 3/2015 | Wang .................... | H04N 5/2226 348/49 |
| 9,001,226 B1* | 4/2015 | Ng ........................ | H04N 5/23203 348/211.11 |
| 9,383,199 B2 | 7/2016 | Imamura et al. | |
| 9,769,365 B1* | 9/2017 | Jannard .............. | H04N 5/23238 |
| 2009/0167930 A1* | 7/2009 | Safaee-Rad .............. | G02B 7/38 348/347 |
| 2009/0316014 A1* | 12/2009 | Lim ...................... | H04N 5/2254 348/222.1 |
| 2010/0020187 A1 | 1/2010 | Georgiev | |
| 2010/0045844 A1 | 2/2010 | Yamamoto et al. | |
| 2010/0141802 A1* | 6/2010 | Knight ................ | H04N 5/23212 348/240.3 |
| 2011/0129165 A1 | 6/2011 | Lim et al. | |
| 2011/0187878 A1* | 8/2011 | Mor .................... | G02B 27/0983 348/218.1 |
| 2012/0050562 A1 | 3/2012 | Perwass et al. | |
| 2012/0057040 A1* | 3/2012 | Park .................... | H04N 5/2254 348/222.1 |
| 2012/0176506 A1 | 7/2012 | Tajiri | |
| 2012/0177356 A1 | 7/2012 | Georgiev et al. | |
| 2012/0224028 A1* | 9/2012 | Park ..................... | G02B 3/0018 348/46 |
| 2012/0320160 A1* | 12/2012 | Drazic ................. | G01B 11/026 348/46 |
| 2013/0033626 A1* | 2/2013 | Ng ....................... | G02B 3/0056 348/262 |
| 2013/0038748 A1* | 2/2013 | Hatakeyama ........... | G06T 5/003 348/222.1 |
| 2013/0041226 A1* | 2/2013 | McDowall ......... | A61B 1/00009 600/166 |
| 2013/0044234 A1 | 2/2013 | Nagano et al. | |
| 2013/0088489 A1* | 4/2013 | Schmeitz ............. | H04N 5/2254 345/419 |
| 2013/0113981 A1 | 5/2013 | Knight et al. | |
| 2013/0135515 A1 | 5/2013 | Abolfadl et al. | |
| 2013/0155266 A1* | 6/2013 | Zhou ................. | H04N 5/23258 348/208.99 |
| 2013/0215231 A1 | 8/2013 | Hiramoto et al. | |
| 2013/0222633 A1* | 8/2013 | Knight ............... | H04N 5/23293 348/222.1 |
| 2014/0009503 A1* | 1/2014 | Gorstan .................... | G06T 3/20 345/680 |
| 2014/0009570 A1* | 1/2014 | Gorstan ............. | H04N 5/23238 348/36 |
| 2014/0023283 A1* | 1/2014 | Liu ...................... | G02B 21/367 382/232 |
| 2014/0198230 A1* | 7/2014 | Tsutsumi ............. | H04N 5/2258 348/218.1 |
| 2014/0219576 A1* | 8/2014 | Yokoyama .............. | G06T 5/003 382/255 |
| 2014/0240578 A1* | 8/2014 | Fishman ............ | H04N 5/23293 348/333.08 |
| 2014/0253760 A1* | 9/2014 | Watanabe .............. | H04N 5/142 348/239 |
| 2014/0267602 A1* | 9/2014 | Tzur ................... | H04N 13/0018 348/43 |
| 2015/0042834 A1* | 2/2015 | Miao .................... | H04N 5/2257 348/218.1 |
| 2015/0104074 A1* | 4/2015 | Vondran, Jr. ......... | H04N 13/133 382/106 |
| 2015/0104076 A1* | 4/2015 | Hayasaka .............. | H04N 5/247 382/106 |

FOREIGN PATENT DOCUMENTS

| | | |
|---|---|---|
| CN | 102314683 A | 1/2012 |
| CN | 102439979 A | 5/2012 |
| CN | 102595170 A | 7/2012 |
| CN | 102656878 A | 9/2012 |
| CN | 101656835 B | 10/2012 |
| CN | 102739945 A | 10/2012 |
| CN | 103119516 A | 5/2013 |
| CN | 103139470 A | 6/2013 |
| CN | 101605208 B | 8/2013 |
| CN | 103403494 A | 11/2013 |
| EP | 2134079 B1 | 11/2012 |
| JP | 20139274 A | 1/2013 |
| KR | 10-2009-0131466 A | 12/2009 |
| KR | 10-2013-0020579 A | 2/2013 |
| KR | 10-2013-0128226 A | 11/2013 |
| WO | WO 2013167758 A1 * | 11/2013 ......... H04N 13/0232 |

OTHER PUBLICATIONS

Search Report dated Apr. 29, 2015, issued by the International Searching Authority in counterpart International Application No. PCT/KR2015/001572.

Written Opinion dated Apr. 29, 2015, issued by the International Searching Authority in counterpart International Application No. PCT/KR2015/001572.

Communication dated Nov. 14, 2017, issued by the State Intellectual Property Office of People's Republic of China in counterpart Chinese Application No. 201580013807.1.

Communication dated Jul. 3, 2018, issued by the State Intellectual Property Office of P.R. China in counterpart Chinese Application No. 201580013807.1.

* cited by examiner

IMAGE PICKUP APPARATUS AND METHOD FOR GENERATING IMAGE HAVING DEPTH INFORMATION

CROSS REFERENCE TO RELATED APPLICATION

This application claims priority from Korean Patent Application Nos. 10-2014-0029771, filed on Mar. 13, 2014, and 10-2014-0135120, filed on Oct. 7, 2014, in the Korean Intellectual Property Office, the disclosure of which is incorporated herein in its entirety by reference.

BACKGROUND

1. Field

One or more exemplary embodiments relate to an image pickup apparatus and method for generating an image having depth information, and more particularly, to an image pickup apparatus and method capable of improving the resolution of an image having depth information which is generated using light field technology.

2. Description of the Related Art

A related art two-dimensional (2D) camera generates an image by acquiring, via an image sensor, information on the intensity of light incident through an objective lens. For example, information on the intensity of light for one point of an object may be obtained by focusing a plurality of light beams from the one point of the object on one point of the image sensor through the objective lens and accumulating the intensity of light for a preset time. In this way, one image may be generated using information on the intensity of light that is obtained from a plurality of pixels of the image sensor. However, in an image pickup method of the 2D camera, information on intensities and directions of individual light beams coming from one point of an object cannot be acquired.

Light field technology is used to generate an image corresponding to an arbitrary viewpoint or an arbitrary focal point by acquiring information on individual intensities and directions of a plurality of light beams coming from one point of an object. When the light field technology is used, a three-dimensional (3D) camera capable of obtaining information on a plurality of viewpoints of an object and depth information of the object may be implemented. Additionally, a camera having a refocusing effect capable of focusing on all objects within a view angle may be implemented.

A camera to which the light field technology is applied may be implemented by using a main lens and a micro lens array. For example, the micro lens array having a plurality of 2D-arranged micro lenses may be arranged between the main lens and an image sensor. One micro lens in the micro lens array may correspond to a plurality of pixels in the image sensor. Therefore, images of different viewpoints may be respectively obtained from the plurality of pixels corresponding to the one micro lens. For example, when the one micro lens covers 7×7 pixels, 49 (i.e., 7×7) images of different viewpoints may be simultaneously obtained.

However, the resolution of an image in a light field camera is determined not by a pixel pitch of an image sensor, but by a pitch of a micro lens. For example, an increase in the size of a micro lens causes a decrease in the resolution of an image, and a decrease in the size of a micro lens causes an increase in the resolution of an image. Therefore, when the size of a micro lens increases in order to increase the number of images having different viewpoints (i.e., the number of pixels corresponding to the micro lens), the resolution of an image decreases. Conversely, when the size of a micro lens decreases in order to increase the resolution of an image, the number of simultaneously obtained images having different viewpoints decreases. As a result, a trade-off occurs between the resolution of an image and a parallax detection ability.

SUMMARY

Aspects of one or more exemplary embodiments provide an image pickup apparatus and method capable of improving the resolution of an image having depth information that is generated using a light field technology.

Additional aspects will be set forth in part in the description which follows and, in part, will be apparent from the description, or may be learned by practice of exemplary embodiments.

According to an aspect of an exemplary embodiment, there is provided an image pickup apparatus including: a main lens configured to refract incident light; an image sensor including a plurality of two-dimensional (2D)-arranged pixels configured to sense the incident light and to output an image signal according to the sensed incident light; a micro lens array between the main lens and the image sensor and including a plurality of 2D-arranged micro lenses; and a controller configured to receive the image signal from the image sensor and to generate an image according to the received image signal, wherein the controller is configured to obtain a plurality of images having different depths of field by changing a distance between the main lens and the image sensor and to obtain at least one depth map, respectively corresponding to the at least one of the obtained plurality of images, from the at least one of the obtained plurality of images.

The controller may be configured to obtain a first image by initially setting the distance between the main lens and the image sensor to focus on a predetermined distance, and to obtain a depth map from the obtained first image, and in response to an object being selected, the controller may be configured to obtain a second image in which the selected object is focused by adjusting, using the obtained depth map, the distance between the main lens and the image sensor to focus on the selected object.

The predetermined distance may be a hyperfocal distance.

The object may be selected by a user input.

Each of the plurality of 2D-arranged micro lenses may respectively correspond to at least two pixels in the image sensor.

The controller may be configured to obtain a depth map by using outputs of at least two pixels corresponding to a same micro lens, among the plurality of 2D-arranged micro lenses, and to generate an image by combining the outputs of the at least two pixels corresponding to the same micro lens.

The controller may be configured to change the distance between the main lens and the image sensor on the basis of a depth of focus (DOF) as a basic step unit.

The controller may be configured to respectively obtain in-focus images for all objects located between an infinite distance to a closest focusing distance by, each time the distance between the main lens and the image sensor is changed according to the DOF unit, obtaining an image through the image sensor and obtaining a depth map.

The controller may be configured to determine an object region where a depth value is a minimum in each depth map generated each time the distance between the main lens and the image sensor is changed according to the DOF unit.

The controller may be configured to, in response to an object region being selected from the plurality of images, select a depth map of which a depth value in the selected object region is a minimum and to output an image corresponding to the selected depth map.

The controller may be configured to change the distance between the main lens and the image sensor according to the DOF unit between Dh and Dc, where the distance between the main lens and the image sensor when focusing on a hyperfocal distance is Dh, and the distance between the main lens and the image sensor when focusing on a closest focusing distance is Dc.

The controller may be configured to sequentially change the distance between the main lens and the image sensor according to the DOF unit until the distance between the main lens and the image sensor becomes Dc after initially setting the distance between the main lens and the image sensor as Dh.

The controller may be configured to obtain an image and a depth map by initially setting the distance between the main lens and the image sensor as Dh and to adjust the distance between the main lens and the image sensor according to the DOF unit by analyzing the depth map so that an image is obtained only for a depth of field where an object exists.

The DOF may be determined as 2×(an aperture ratio of the main lens)×(a circle of confusion (CoC)), and a size of the CoC may be equal to one or two pitches of a micro lens.

The control unit may be configured to identify based on a depth map of an initial image a background and candidate objects of interest in the initial image picked up by focusing at a hyperfocal distance, to select objects of interest according to a predetermined condition from among the identified candidate objects of interest, and to perform photographing for a depth of a field range wherein each of the selected objects of interest exists by using a depth value of each of the selected objects of interest.

The control unit may be configured to adjust the number of selected objects of interest according to a remaining capacity of each of a battery and a memory.

According to an aspect of another exemplary embodiment, there is provided an image pickup method of an image pickup apparatus including a main lens and a micro lens array between the main lens and an image sensor and including a plurality of two-dimensional (2D)-arranged micro lenses, the method including: obtaining a plurality of images having different depths of field by changing a distance between the main lens and the image sensor; and obtaining at least one depth map, respectively corresponding to at least one of the obtained plurality of images, from the at least one of the obtained plurality of images.

The obtaining the at least one depth map may include obtaining a depth map from a first image, and the obtaining the plurality of images may include: obtaining the first image by initially setting the distance between the main lens and the image sensor to focus on a predetermined distance; and in response to an object being selected, obtaining a second image in which the selected object is focused by adjusting, using the obtained depth map, the distance between the main lens and the image sensor to focus on the selected object.

The predetermined distance may be a hyperfocal distance.

The object may be selected by a user input.

Each of the plurality of 2D-arranged micro lenses may respectively correspond to at least two pixels in the image sensor.

The image pickup method may further include: obtaining a depth map by using outputs of at least two pixels corresponding to a same micro lens, among the plurality of 2D-arranged micro lenses; and generating an image by combining the outputs of the at least two pixels corresponding to the same micro lens.

The distance between the main lens and the image sensor may be changed according to a depth of focus (DOF) as a step unit.

The obtaining the plurality of images may include obtaining in-focus images for all objects located from an infinite distance to a closest focusing distance by, each time the distance between the main lens and the image sensor is changed according to the DOF unit, obtaining an image and obtaining a depth map.

The image pickup method may further include determining an object region where a depth value is a minimum in each depth map generated each time the distance between the main lens and the image sensor is changed according to the DOF unit.

The image pickup method may further include: selecting an object region from the plurality of images; selecting a depth map of which a depth value in the selected object region is a minimum; and outputting an image corresponding to the selected depth map.

The distance between the main lens and the image sensor may be changed according to the DOF unit between Dh and Dc, where the distance between the main lens and the image sensor when focusing on a hyperfocal distance is Dh, and the distance between the main lens and the image sensor when focusing on a closest focusing distance is Dc.

The obtaining the plurality of images may include: initially setting the distance between the main lens and the image sensor as Dh; and sequentially changing the distance between the main lens and the image sensor according to the DOF unit until the distance between the main lens and the image sensor becomes Dc.

The obtaining the plurality of images may include: initially setting the distance between the main lens and the image sensor as Dh; and changing the distance between the main lens and the image sensor according to the DOF unit by analyzing the depth map obtained in the initial setting of the distance so that an image is obtained only for a depth of field where an object exists.

The DOF may be determined as 2×(an aperture ratio of the main lens)×(a circle of confusion (CoC)), and a size of the CoC may be equal to one or two pitches of a micro lens among the plurality of 2D-arranged micro lenses.

The image pickup method may further include: picking up an initial image by focusing at a hyperfocal distance; identifying a background and candidate objects of interest in the initial image through a depth map of the picked up initial image; selecting objects of interest according to a predetermined condition from among the identified candidate objects of interest; and performing photographing for a depth of a field range wherein each of the selected objects of interest exists by using a depth value of each of the selected objects of interest.

The image pickup method may further include: checking a remaining capacity of each of a battery and a memory; and adjusting the number of selected objects of interest according to the remaining capacity of each of the battery and the memory.

According to an aspect of another exemplary embodiment, there is provided a refocusing method of an image pickup apparatus comprising a main lens and an image sensor, the refocusing method including: obtaining a plurality of images having different depths of field; obtaining a depth map from each of the obtained plurality of images; determining, for each depth map, an object region where a depth value in the depth map is a minimum; selecting an object region from the obtained plurality of images; selecting a depth map of which a depth value in the selected object region is a minimum; and outputting an image corresponding to the selected depth map.

According to an aspect of another exemplary embodiment, there is provided an image pickup apparatus including: a main lens configured to refract incident light; an image sensor including a plurality of two-dimensional (2D)-arranged pixels configured to sense the incident light and to output an image signal according to the sensed incident light; a micro lens array between the main lens and the image sensor and including a plurality of 2D-arranged micro lenses; and a controller configured to receive the image signal from the image sensor and to generate an image according to the received image signal, wherein the controller is configured to obtain a first image, having a first depth of field, by initially setting a distance between the main lens and the image sensor to focus on a predetermined distance, and to obtain a depth map from the obtained first image, and wherein in response to an object being selected, the controller is configured to obtain a second image, having a second depth of field different from the first depth of field, in which the selected object is focused by adjusting, using the obtained depth map, the distance between the main lens and the image sensor to focus on the selected object.

The predetermined distance may be a hyperfocal distance.

The object may be selected by a user input.

Each of the plurality of 2D-arranged micro lenses may respectively correspond to at least two pixels in the image sensor.

According to an aspect of another exemplary embodiment, there is provided a refocusing method of an image pickup apparatus including a main lens and an image sensor, the refocusing method including: obtaining a first image having a first depth of field; obtaining a depth map from the obtained first image; and in response to an object being selected, obtaining a second image, having a second depth of field different from the first depth of field, in which the selected object is focused by adjusting, using the obtained depth map, a distance between a main lens and an image sensor to focus on the selected object.

The obtaining the first image may include initially setting a distance between the main lens and the image sensor to focus on a predetermined distance.

The predetermined distance may be a hyperfocal distance.

The object may be selected by a user input.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION OF EXEMPLARY EMBODIMENTS

Figure 1:
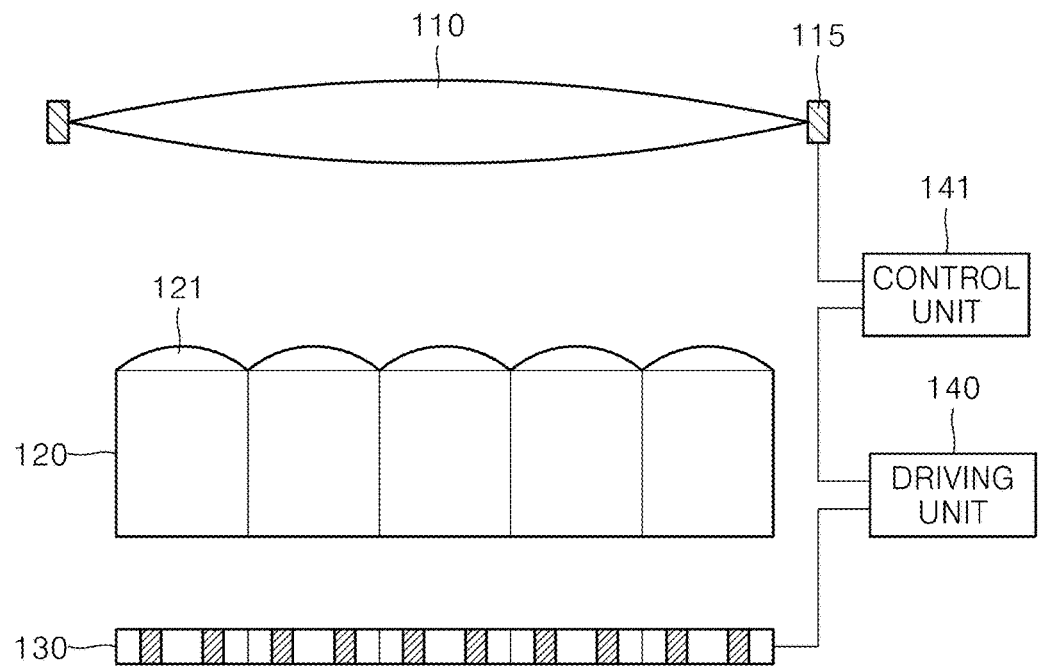
FIG. 1 illustrates an image pickup apparatus according to an exemplary embodiment.

Hereinafter, an image pickup apparatus and method for generating an image having depth information will be described with reference to the accompanying drawings. In the drawings, like reference numerals refer to like elements throughout. In the drawings, the structures or sizes of components may be exaggerated for convenience and clarity of description. In this regard, the exemplary embodiments may have different forms and should not be construed as being limited to the descriptions set forth herein. Accordingly, exemplary embodiments are merely described below, by referring to the figures, to explain aspects of the present description. In addition, when it is described that a certain component is above another component in a layer structure, the certain component may be directly above another component, or a third component may be interposed therebetween. Furthermore, it is understood that expressions such as "at least one of," when preceding a list of elements, modify the entire list of elements and do not modify the individual elements of the list.

FIG. 1 illustrates an image pickup apparatus 100 according to an exemplary embodiment. Referring to FIG. 1, the image pickup apparatus 100 according to the current exemplary embodiment may include a main lens 110 for refracting (e.g., condensing) incident light, an image sensor 130 having a plurality of two-dimensional (2D)-arranged pixels to form an image by sensing the incident light, and a micro lens array 120 disposed between the main lens 110 and the image sensor 130. The image pickup apparatus 100 may further include an actuator 115 for moving the main lens 110 to focus on an object, a driver 141 (e.g., driving unit) for providing an operation signal to the actuator 115, and a controller 140 (e.g., control unit) for receiving an image signal from the image sensor 130 and generating an image having depth information. The controller 140 may also operate to change a distance between the main lens 110 and the image sensor 130 by controlling operations of the driver 141 and the actuator 115.

Although FIG. 1 shows, for convenience of description, that the main lens 110 includes one single-lens element, the main lens 110 may include a plurality of lens elements, e.g., to correct aberration and the like. In addition, when the main lens 110 includes a plurality of lens elements, the actuator 115 may move the whole main lens 110 or move only a portion of the plurality of lens elements. Therefore, in the description below, it will be understood that movement of the main lens 110 includes not only a case where all lens elements of the main lens 110 move together, but also a case where only some lens elements of the main lens 110 move.

The actuator 115 may move the micro lens array 120 and the image sensor 130 instead of (or in addition to) the main lens 110 by, for example, being disposed on at least one of the micro lens array 120 and the image sensor 130. In this case, the controller 140 may control the movement of the micro lens array 120 and the image sensor 130 instead of (or in addition to) the main lens 110 in order to change the distance between the main lens 110 and the image sensor 130. In the description below, it is described for convenience of description that the main lens 110 moves, but it will be understood that the movement of the main lens 110 is a relative movement of the main lens 110 against the image sensor 130, and the distance between the main lens 110 and the image sensor 130 is changed.

The micro lens array 120 may include a plurality of 2D-arranged micro lenses 121. Like the normal light field technology, the micro lens array 120 may be disposed between the main lens 110 and the image sensor 130. The plurality of micro lenses 121 in the micro lens array 120 may have the same focal length and diameter.

The image sensor 130 converts the intensity of the incident light into an electrical signal and outputs the converted electrical signal. For example, the image sensor 130 may be a charge-coupled device (CCD) or a complementary metal oxide semiconductor (CMOS) image sensor. The image sensor 130 may include a plurality of 2D-arranged pixels. Each of the pixels may independently sense incident light and output an electrical signal based on the intensity of the incident light.

The controller 140 may generate an image by processing electrical signals output from the plurality of pixels in the image sensor 130. In addition, the controller 140 may generate a depth map by extracting depth information of objects in an image and perform a focus bracketing operation by controlling the actuator 115 through the driver 141 on the basis of the depth map in order to obtain a plurality of images having different depths of field. In addition, the controller 140 may perform a refocusing operation of focusing on a certain object according to a command of a user by using a plurality of images having different depths of field. These operations will be described below in more detail.

To obtain depth information of a plurality of objects in an image, each of the micro lenses 121 in the micro lens array 120 may correspond to at least two pixels in the image sensor 130. In this case, each of at least two pixels in the image sensor 130, which correspond to one micro lens 121, may detect a light beam having a different parallax (as compared to the other of the two pixels) for the same object.

Figure 2A:
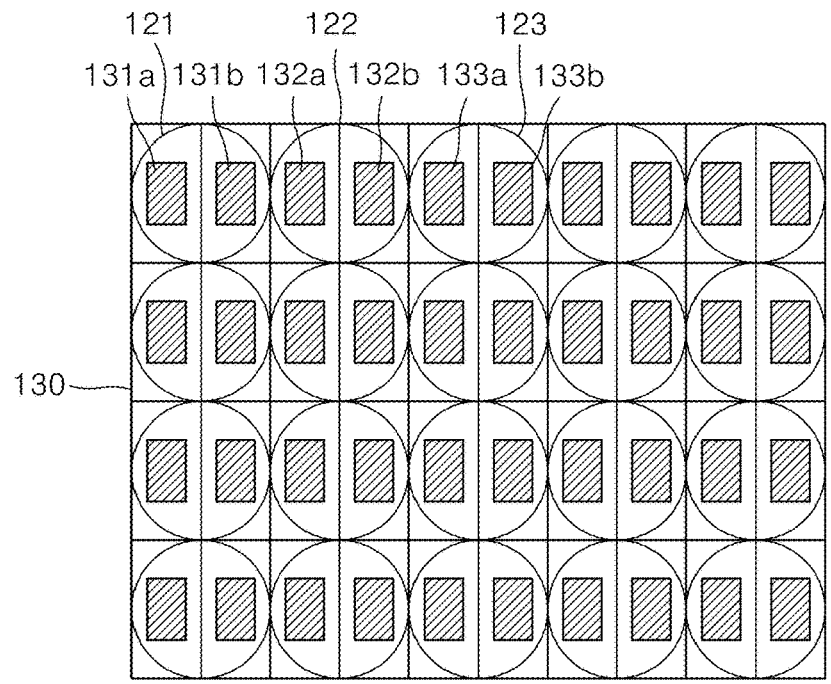
FIG. 2A illustrates a location relationship between pixels in an image sensor and individual micro lenses.

For example, FIG. 2A illustrates a location relationship between two pixels 131a and 131b in the image sensor 130 and an individual micro lens 121. That is, the two pixels 131a and 131b correspond to the individual micro lens 121. As shown in FIG. 2A, only the two pixels 131a and 131b may be arranged in a horizontal direction for the one micro lens 121. The two pixels 131a and 131b corresponding to the one micro lens 121 may sense lights reflected from a same point of an object and having different viewpoints. For example, the left pixel 131a may sense a light beam passing through a right region of an entrance pupil of the main lens 110, and the right pixel 131b may sense a light beam passing through a left region of the entrance pupil of the main lens 110. In this case, two images having different viewpoints in the horizontal direction may be obtained. However, the two images have the same viewpoint without any parallax in a vertical direction. Therefore, depth information between objects arranged in the horizontal direction may be obtained, but depth information between objects arranged in the vertical direction may not be obtained in the present exemplary embodiment.

Figure 2B:
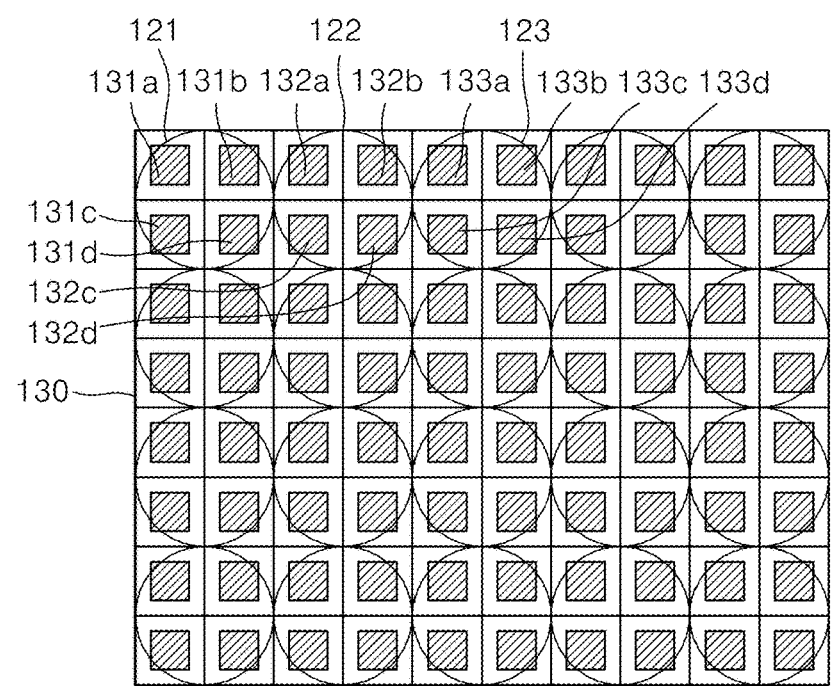
FIG. 2B illustrates another location relationship between pixels in an image sensor and individual micro lenses.

FIG. 2B illustrates another location relationship between four pixels 131a, 131b, 131c, and 131d in the image sensor 130 and an individual micro lens 121. That is, the four pixels 131a, 131b, 131c, and 131d correspond to the individual micro lens 121. Referring to FIG. 2B, the four 2×2-arranged pixels 131a, 131b, 131c, and 131d may be disposed for the one micro lens 121. In this case, not only a horizontal parallax, but also a vertical parallax may be obtained. Therefore, both depth information between objects arranged in the horizontal direction and depth information between objects arranged in the vertical direction may be obtained.

When a general color image is generated, each micro lens 121 corresponds to a unit pixel of the color image. For example, one unit pixel of a color image signal may be obtained by combining (e.g., summing) outputs of the two pixels 131a and 131b or the four pixels 131a, 131b, 131c, and 131d arranged for the one micro lens 121. That is, the controller 140 may generate depth information by separately using the outputs of the four pixels 131a, 131b, 131c, and 131d arranged for the one micro lens 121 and generate a color image by combining the outputs of the four pixels 131a, 131b, 131c, and 131d arranged for the one micro lens 121. To this end, a same color filter may be disposed on the four pixels 131a, 131b, 131c, and 131d arranged for the one micro lens 121. For example, a red color filter may be disposed on the four pixels 131a, 131b, 131c, and 131d arranged for a first micro lens 121, a green color filter may be disposed on four pixels 132a, 132b, 132c, and 132d arranged for a second micro lens 122, and a blue color filter may be disposed on four pixels 133a, 133b, 133c, and 133d arranged for a third micro lens 123. That is, the four pixels 131a, 131b, 131c, and 131d arranged for the one micro lens 121 may be configured so as to sense light of the same color.

As described above, a resolution of a color image is determined by a size of each micro lens 121 in the micro lens array 120 regardless of an actual resolution (e.g., number of pixels) of the image sensor 130. For example, in the case of FIG. 2A, a resolution of the color image is half the actual resolution of the image sensor 130, and in the case of FIG. 2B, a resolution of the color image is ¼th the actual resolution of the image sensor 130. Although FIGS. 2A and 2B show examples in which the two pixels 131a and 131b or the four pixels 131a, 131b, 131c, and 131d are arranged for the one micro lens 121, the number of pixels in the image sensor 130 arranged for the one micro lens 121 may be greater than four or less than four to obtain a plurality of images having more viewpoints at the same time. However, a resolution of a color image may decrease as much as the increased number of pixels.

The image pickup apparatus 100 according to the current exemplary embodiment obtains a plurality of images having different depths of field through focus bracketing in order to obtain a plurality of images having different viewpoints without decreasing a resolution of a color image. A particular method of operating the image pickup apparatus 100 according to the current exemplary embodiment will now be described in detail.

Figure 3:
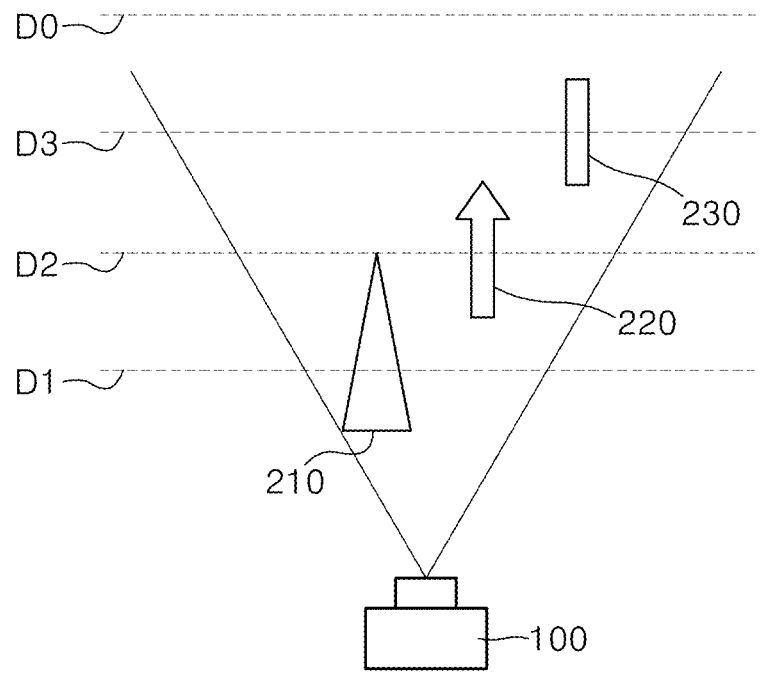
FIG. 3 illustrates locations of a plurality of objects photographed by the image pickup apparatus of FIG. 1.

FIG. 3 illustrates locations of a plurality of objects photographed by the image pickup apparatus 100 according to the current exemplary embodiment. For example, it is assumed that a first object 210 is disposed at a distance D1 from the image pickup apparatus 100, a second object 220 is disposed at a distance D2 from the image pickup apparatus 100, and a third object 230 is disposed at a distance D3 from the image pickup apparatus 100. In FIG. 3, D0 denotes a hyperfocal distance. The hyperfocal distance is the closest distance from a camera on which an image is clearly formed when a focal point of the camera is adjusted to infinity. Therefore, for objects located farther than D0, when a focal point of the image pickup apparatus 100 is adjusted to infinity, a clear image is always formed regardless of a distance from the image pickup apparatus 100.

In an image obtained by photographing the first object 210, the second object 220, and the third object 230 by using a related art camera, correct distance information (i.e., depth information) of the first object 210, the second object 220, and the third object 230 is difficult to obtain since the first object 210, the second object 220, and the third object 230 are generally displayed on a 2D plane. Accordingly, since only an object in focus is clearly displayed, and an object out of focus is blurred, it may be recognized that the object out of focus is located in the front of or the rear of the object in focus.

Figure 4A:
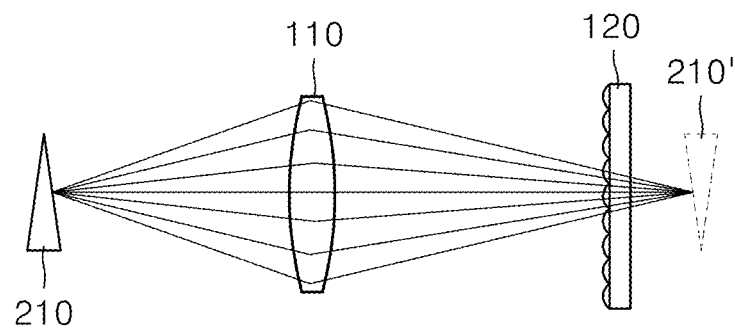
FIGS. 4A to 4C illustrate focusing states according to distances between the objects and the image pickup apparatus.
Figure 4B:
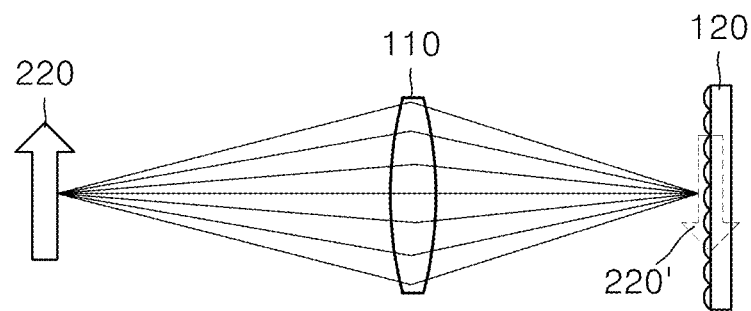
Figure 4C:
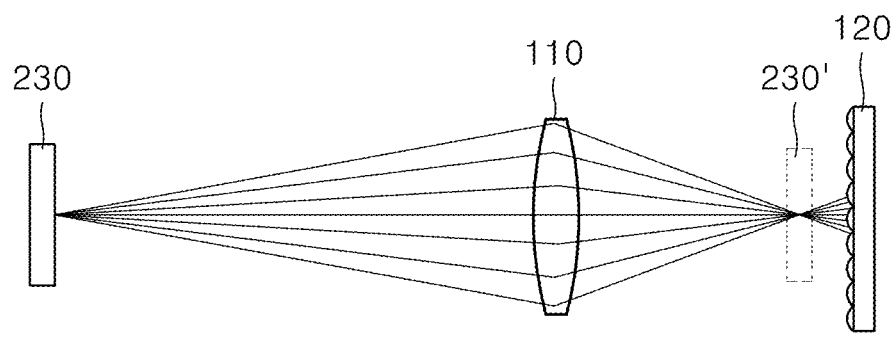
Figure 5:
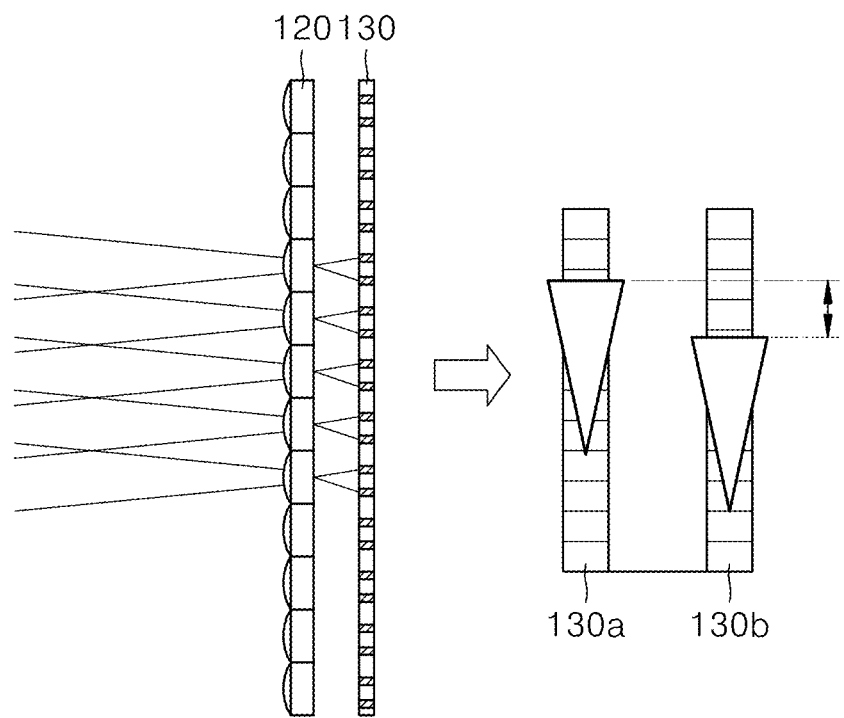
FIG. 5 illustrates an image location difference between two pixel columns when an image formed by a main lens is located at the rear of a micro lens array.
Figure 6:
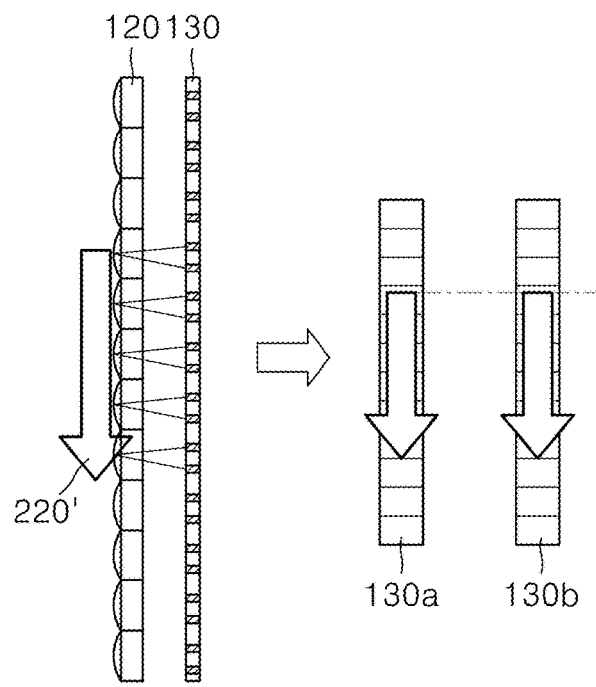
FIG. 6 illustrates an image location difference between two pixel columns when an image formed by the main lens is exactly located on a micro lens array.
Figure 7:
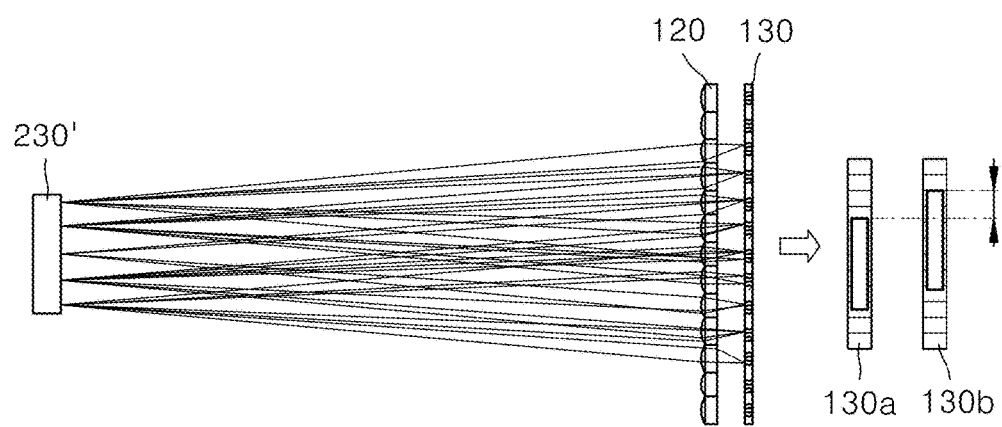
FIG. 7 illustrates an image location difference between two pixel columns when an image formed by the main lens is located in front of a micro lens array.

However, in the image pickup apparatus 100 according to the current exemplary embodiment, since depth information may be obtained as described in detail below with reference to FIGS. 4A to 4C and 5 to 7, distances of the first object 210, the second object 220, and the third object 230 may be recognized. FIGS. 4A to 4C illustrate focusing states according to distances between the first object 210, the second object 220, and the third object 230 and the image pickup apparatus 100. In FIGS. 4A to 4C, it is assumed for convenience of description that only the second object 220 is in focus from among the first object 210, the second object 220, and the third object 230. In addition, FIG. 5 illustrates an image location difference between two pixel columns 130a and 130b (i.e., a left pixel column 130a and a right pixel column 130b) when an image formed by the main lens 110 is located at the rear of (i.e., behind) the micro lens array 120. FIG. 6 illustrates an image location difference between the two pixel columns 130a and 130b when an image formed by the main lens 110 is exactly located on the micro lens array 120. Furthermore, FIG. 7 illustrates an image location difference between the two pixel columns 130a and 130b when an image formed by the main lens 110 is located in front of the micro lens array 120.

In general, a focal length of a lens is obtained by assuming that incident light is parallel light (that is, an object is located at infinity). Therefore, for an actual object, an image is formed at a distance farther than the focal length of the lens, and the nearer a distance between the object and the lens, the farther a distance at which an image of the object is formed. For example, referring to FIG. 4A, for the first object 210 located nearest to the image pickup apparatus 100, an image 210' is formed at the rear of (i.e., behind) the micro lens array 120. In this case, since the micro lens array 120 cannot allow the image 210' of the first object 210 to be exactly formed on the image sensor 130, the first object 210 is blurred in an image output by the image sensor 130.

In a related art camera, only information indicating that the first object 210 is out of focus is obtained, and depth information of the first object 210 is not obtained. However, referring to FIG. 5, in the image pickup apparatus 100 according to the current exemplary embodiment, since a parallax exists between a left pixel column 130a and a right pixel column 130b arranged in micro lenses of one column of the micro lens array 120, a depth difference, i.e., a pixel disparity, occurs between image signals respectively generated by the left pixel column 130a and the right pixel column 130b. The pixel disparity may be calculated backwards as a depth value of the first object 210, i.e., the pixel disparity corresponds to a depth value such that the depth value may be calculated from the pixel disparity. Therefore, the image pickup apparatus 100 according to the current exemplary embodiment may obtain depth information of the first object 210.

Referring to FIG. 4B, an image 220' of the second object 220 located farther than the first object 210 is exactly formed on the micro lens array 120. In this case, the micro lens array 120 may allow the image 220' of the second object 220 to be exactly formed on the image sensor 130. Therefore, the second object 220 is clearly viewed in an image output by the image sensor 130. In addition, as shown in FIG. 6, since a depth difference does not occur between image signals respectively generated by the left pixel column 130a and the right pixel column 130b arranged in the micro lenses of the one column of the micro lens array 120, a pixel disparity does not occur. Therefore, a depth value of the second object 220 is zero (0).

Referring to FIG. 4C, an image 230' of the third object 230 located farther than the second object 220 is formed in front of the micro lens array 120. In this case, since the micro lens array 120 cannot allow the image 230' of the third object 230 to be exactly formed on the image sensor 130, the third object 230 is blurred in an image output by the image sensor 130. Referring to FIG. 7, a depth difference occurs between image signals respectively generated by the left pixel column 130a and the right pixel column 130b arranged in the micro lenses of the one column of the micro lens array 120. As compared to FIG. 5, a direction of the depth difference between the left pixel column 130a and the right pixel column 130b in FIG. 7 is opposite to that in FIG. 5. For example, the depth value in FIG. 5 may be defined as negative (−), and the depth value in FIG. 7 may be defined as positive (+) (or vice-versa in one or more other exemplary embodiments). Therefore, it may be determined that an object of which a depth value is negative is located closer than a focal length, and an object of which a depth value is positive is located farther than the focal length. The greater a defocus is, the greater the parallax, thereby increasing a pixel disparity. Therefore, a distance (i.e., depth) of an object may be approximately determined from a magnitude of a depth value.

In the method described above, the image pickup apparatus 100 according to the current exemplary embodiment may generate a depth map for objects and obtain an image having depth information. In the depth map, a depth value of an object in focus is zero (0), a depth value of an object located in front of the object in focus may be a negative value, and a depth value of an object located behind the object in focus may be a positive value. In addition, the farther a distance from the object in focus, the greater a magnitude of a depth value.

Figure 8A:
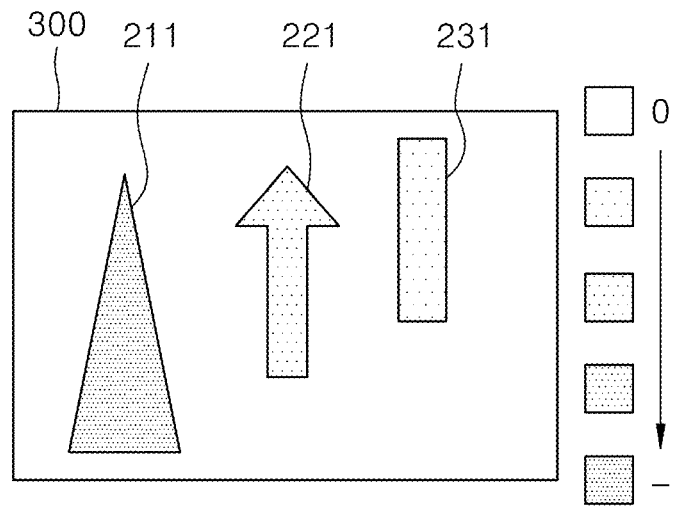
FIGS. 8A to 8D illustrate depth maps of images obtained by photographing the objects shown in FIG. 3.
Figure 8B:
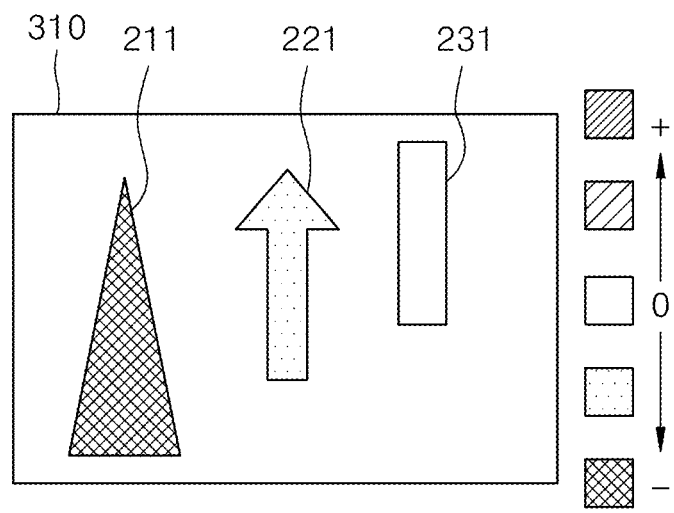
Figure 8C:
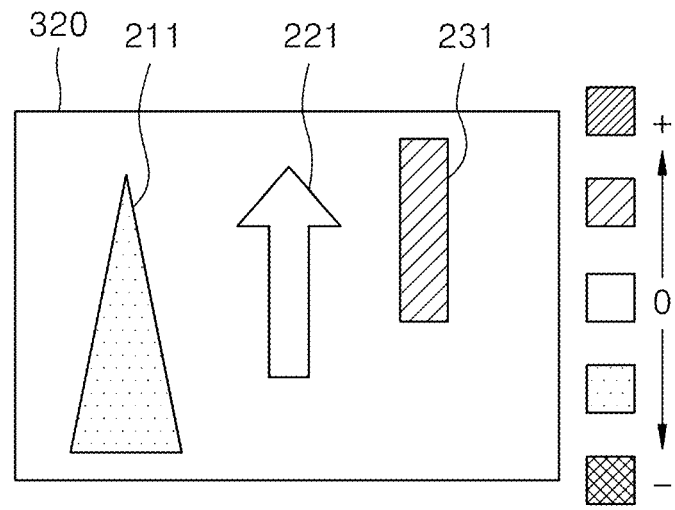
Figure 8D:
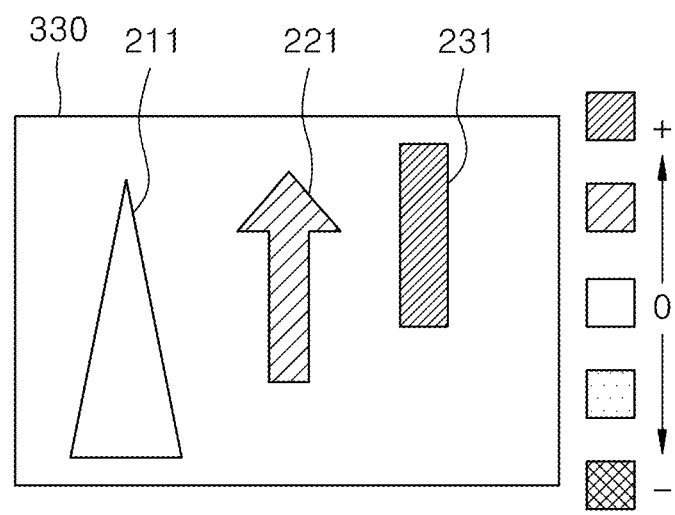

FIGS. 8A to 8D illustrate depth maps 300, 310, 320, and 330 of images obtained by photographing the first object 210, the second object 220, and the third object 230 shown in FIG. 3. For example, FIG. 8A shows the depth map 300 obtained when the image pickup apparatus 100 is focused at the distance D0, i.e., the hyperfocal distance. In this case, depth values 211, 221, and 231 of the first to third objects 210, 220, and 230 in the depth map 300 are negative values, respectively, although of different magnitudes. As another example, FIG. 8B shows the depth map 310 obtained when the image pickup apparatus 100 is focused on the third object 230 located at the distance D3. In this case, in the depth map 310, the depth value 231 of the third object 230 is zero (0), and the depth values 211 and 221 of the first and second objects 210 and 220 are negative values, respectively, although of different magnitudes. As another example, FIG. 8C shows the depth map 320 obtained when the image pickup apparatus 100 is focused on the second object 220 located at the distance D2. In this case, in the depth map 320, the depth value 221 of the second object 220 is zero (0), the depth value 211 of the first object 210 is a negative value, and the depth value 231 of the third object 230 is a positive value. As another example, FIG. 8D shows the depth map 330 obtained when the image pickup apparatus 100 is focused on the first object 210 located at the distance D1. In this case, in the depth map 330, the depth value 211 of the first object 210 is zero (0), and the depth values 221 and 231 of the second and third objects 220 and 230 are positive values, respectively, although of different magnitudes.

As described above, it may be determined that an object of which a depth value is zero (0) in a depth map is in focus. In addition, a distance by which an object out of focus is separated from an object in focus in front of or behind the object out of focus may be determined on the basis of a magnitude and a sign (i.e., positive or negative) of a depth value of the object out of focus. Therefore, when a plurality of images in which objects located at different distances are respectively in focus are obtained, it is possible to display an image in which an object selected by the user is in focus.

An operation of processing an image such that only a certain object selected by the user from among a plurality of objects located at different distances is in focus and clearly viewed and the other objects are out of focus and blurred is referred to as refocusing. For the refocusing, at least two pieces of information, i.e., a plurality of images in which objects located at different distances are respectively in focus and a depth map including distance information between the objects, may be requested or used. When there is no depth map, even though a plurality of images in which objects located at different distances are respectively in focus are obtained, an image in which a certain object selected by the user is in focus cannot be automatically selected through post-processing or computer algorithm computation because it cannot be determined what object is in focus without a depth map. Therefore, even though a plurality of images having different depths of field are captured by using a related art camera, refocusing cannot be performed since a depth map does not exist. In this regard, the refocusing operation is a representative operation of a light field camera. A related art light field camera obtains a plurality of images having different viewpoints at once by one-time capturing for the refocusing operation, and accordingly, a resolution of each of the plurality of images may be lowered.

Figure 9:
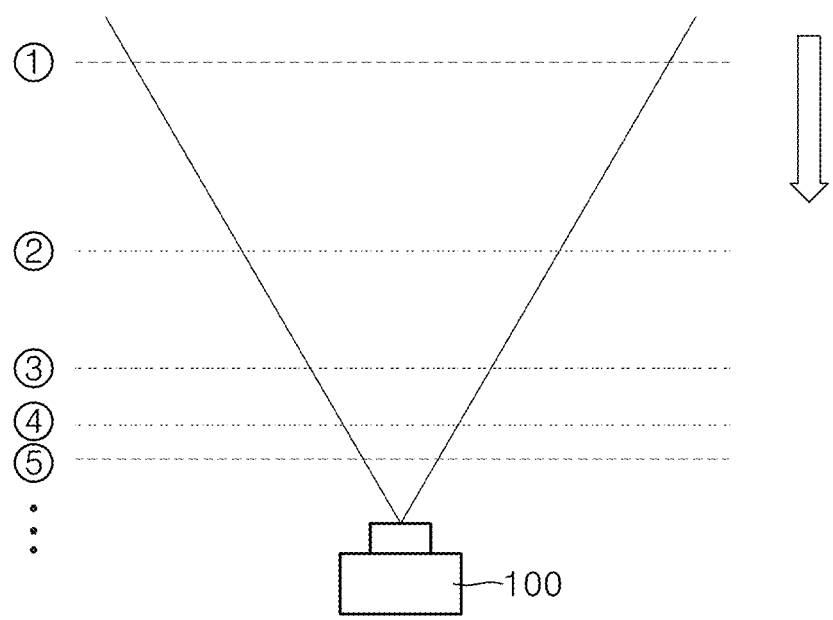
FIG. 9 illustrates an operation of sequentially performing focus bracketing by moving a location of the main lens in an image pickup method according to an exemplary embodiment.

The image pickup apparatus 100 according to the current exemplary embodiment may sequentially obtain (i.e., pick up) a plurality of images having different viewpoints by changing a depth of field through focus bracketing, instead of picking up a plurality of images having different viewpoints by one-time capturing. For example, FIG. 9 illustrates an operation of performing focus bracketing by moving a location of the main lens 110 to sequentially change a depth of field in an image pickup method according to an exemplary embodiment. Referring to FIG. 9, first, capturing may be performed by moving a location of the main lens 110 so as to be in focus at a distance indicated by ①. Subsequently, capturing may be performed by moving a location of the main lens 110 so as to be in focus at a distance indicated by ②. Thereafter, capturing may be sequentially performed by moving a location of the main lens 110 so as to be in focus at distances indicated by ③, ④, and ⑤. Although FIG. 9 shows that focus bracketing is performed from far to near as indicated by an arrow, it is understood that one or more other exemplary embodiments are not limited thereto. For example, according to another exemplary embodiment, the focus bracketing may be performed from near to far (i.e., from ⑤ to ①), or in another order.

When one focus bracketing operation (i.e., step) is completed by capturing images through adjustment of a depth of field, the controller 140 may generate an image (e.g., color image) and calculate a depth map through image processing of the captured images. After calculating the depth map, a plurality of regions may be identified according to depth values in an image, and particularly, a region of which a depth value is zero (0) or a region of which a depth value is a minimum may be identified from an image and obtained (e.g., stored in a memory). In this way, until a focus bracketing process completely ends, in each focus bracketing operation, a color image and a depth map may be obtained, and a region of which a depth value is zero (0) or a region of which a depth value is a minimum may be obtained (e.g., stored).

After the focus bracketing process completely ends, a refocusing operation may be performed so that the user may obtain an image in which a region of interest is in focus. A reference for selecting an image in which a region selected by the user is in focus is a depth map. For example, when the user selects an object located at an arbitrary location in an image, a depth value of an object region selected by the user is compared with reference to all depth maps obtained through the focus bracketing process. Thereafter, the refocusing operation may be performed by selecting a depth map in which the depth value of the object region selected by the user is zero (0) or a minimum and selecting, outputting, or displaying on a screen a color image corresponding to the selected depth map. The color image selected in this way may be separately stored according to a command of the user. In addition, a refocusing operation for another region of interest may also be performed.

Another function of the refocusing operation is blurring enhancement. That is, after a desired color image is selected through the refocusing operation, the blurring enhancement may be performed in proportion to magnitudes of depth values for objects other than an object in focus in the color image by adjusting a blur scale factor. For example, when it is assumed that a color image corresponding to the depth map 320 in FIG. 8C is selected, an image of the second object 220 of which a depth value is zero (0) due to being in-focus remains as is, and a blurring effect may be increased or decreased by the blur scale factor through image processing for images of the first object 210 and the third object 230 located respectively at the front of and behind the second object 220. This operation may be performed since each color image has corresponding depth information. When the blur scale factor is multiplied by depth values in a depth map, a depth value of an image in focus always remains zero (0) regardless of the blur scale factor since the depth value of the image in focus is zero (0), but a region of which a depth value is not zero (0) may vary in proportion to the blur scale factor. Therefore, when an algorithm for changing a blur amount of a color image according to a scaled depth value of a depth map is applied, the blurring enhancement may be simply performed. If a depth value that is zero (0) does not exist in a depth map, a minimum depth value may be adjusted to zero (0).

As described above, in the image pickup apparatus 100 according to the current exemplary embodiment, since a plurality of images having different depths of field or viewpoints may be obtained by performing image capturing a plurality of times while adjusting a focal point by changing a location of the main lens 110, sizes of individual micro lenses 121 do not have to be increased to increase the number of images having different viewpoints. Therefore, a sufficient number of images having different viewpoints may be obtained without decreasing the resolution of the images by minimizing a size of the micro lens 121, for example, to two or four times a pixel size of the image sensor 130. Furthermore, where more than two pixels corresponding to each micro lens 121, a user may select the number of viewpoint images to be used for processing. For example, where four pixels correspond to a micro lens 121, a user may select to only use two of the pixels to generate images, or may select to use only two viewpoint images from among four viewpoint images obtained via the four pixels.

A plurality of images in which all objects are respectively in focus may be obtained in the focus bracketing process by optimally determining a bracketing operation, e.g., optimally determining a movement distance of the main lens 110 during focus bracketing. When the movement distance is too short, a plurality of surplus images in which a same object is in focus may be obtained, and the number of capturing times may be too large. Conversely, when the movement distance is too long, an in-focus image may not be obtained for some objects.

To derive or determine an optimal bracketing operation, a relationship between a circle of confusion (CoC) and a depth of focus (DOF) will now be described. Theoretically, a size of a light spot indicating resolving power of a lens reaches a diffraction limitation, and thus when an aberration and an assembling deflection of the main lens 110 is considered, a theoretical size of a light spot cannot be practically obtained. Therefore, a CoC is commonly used as a measure for recognizing as in-focus when the user determines an image with his or her eyes even though the CoC is greater than the diffraction limitation. For example, when a size of a light spot formed on the image sensor 130 is smaller than the CoC, the user may determine that an image is in focus.

Figure 10:
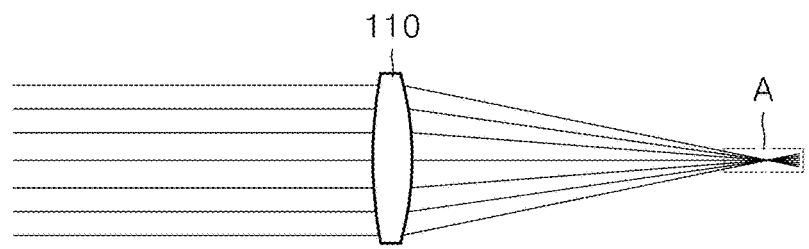
FIGS. 10 and 11 illustrate a relationship between a circle of confusion (CoC) and a depth of focus (DOF)
Figure 11:
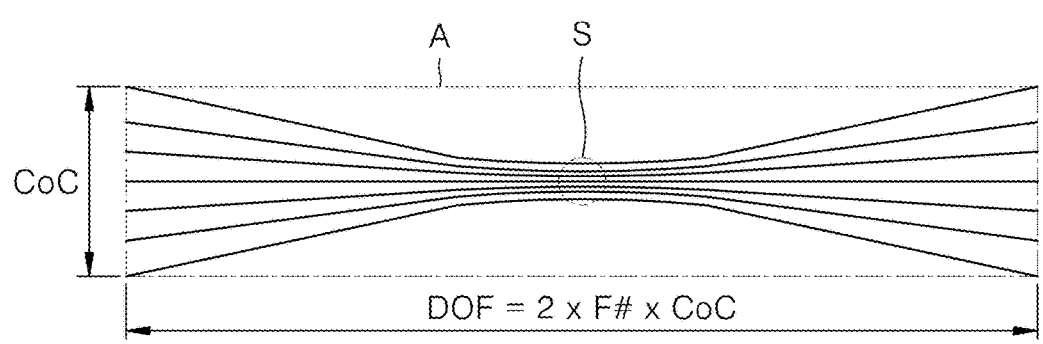

FIGS. 10 and 11 illustrate a relationship between the CoC and a DOF. FIG. 10 schematically shows a region A in which a light spot is formed by the main lens 110, and FIG. 11 is a magnified view of the region A in FIG. 10. Referring to FIGS. 10 and 11, S denotes a light spot that is a theoretical diffraction limitation, CoC stands for circle of confusion that is recognized as in-focus, and DOF stands for depth of focus indicating a section in which the CoC is maintained, i.e., a section that is recognized as in-focus. As shown in FIG. 11, the DOF is determined by an F number (i.e., a numerical aperture) and a size of the CoC of the main lens 110 (that is, DOF=2×F number×CoC).

For example, when it is assumed that the focal length of the main lens 110 is 4.2 mm, the F number of the main lens 110 is 2.2, and the pitch of the micro lens 121 is 2.24 μm, a theoretical size of a light spot for a green light having a wavelength of 540 nm is 1.45 μm (=1.22×F number× wavelength) that is the diffraction limitation. In addition, when a size of the CoC is set so as to correspond to one pitch (i.e., a size of one unit pixel of a color image) of the micro lens 121, the DOF may be 2×2.2×2.24 μm=9.856 μm, and when a size of the CoC is set so as to correspond to two pitches (i.e., a size of two unit pixels of a color image) of the micro lens 121, the DOF may be 2×2.2×4.48 μm=19.712 μm.

An in-focus image on the image sensor 130 with respect to an object located at an arbitrary distance is obtained if an imaging position of the object is within a DOF range. Therefore, to obtain images in which all objects located from the infinite distance to the closest focusing distance are respectively in focus, a driving interval for focal point adjustment of the main lens 110 may be optimized in a DOF unit by using the fact that all objects within the DOF range are in focus. For example, a location at which an object is able to be in focus with respect to a distance that is the hyperfocal distance or more may be set as an initial location for focal point driving of the main lens 110, and a location of the main lens 110 may be changed in a DOF unit from the initial location every time each step of focus bracketing is performed. In this way, each step of focus bracketing may be performed in a DOF unit up to a location where a focus bracketing operation completely ends (i.e., an in-focus location for the closest focusing distance).

In this case, a total number of steps for focus bracketing may be defined by (total trajectory)/(DOF). For example, when it is assumed that the focal length of the main lens 110 is 4.2 mm, the F number of the main lens 110 is 2.2, and the pitch of the micro lens 121 is 2.24 μm, if a focal point meets the hyperfocal distance, the distance between the main lens 110 and the image sensor 130 is 4.2 mm, which is the same as the focal length of the main lens 100. Also, when it is assumed that the closest focusing distance is 10 cm, if a focal point meets the closest focusing distance, the distance between the main lens 110 and the image sensor 130 is calculated as 4.3841 mm by using a lens equation. Therefore, a total trajectory of focal point driving for a focus bracketing process to obtain images in which all objects located from the infinite distance to the closest focusing distance are respectively in focus is 184.1 μm that is different by 4.2 mm from 4.3841 mm.

Then, since the total trajectory of focal point driving for a focus bracketing operation and the DOF of the main lens 110 are known, the total number of steps for the focus bracketing operation may be obtained. For example, when a size of the CoC is set as one pitch of the micro lens 121, the DOF is 9.856 μm, and thus the total number of steps for the focus bracketing operation is calculated as 184.1 μm/9.856 μm=18.7. Therefore, the focus bracketing operation may have a total of 19 steps including the initial location. When it is assumed that the distance between the main lens 110 and the image sensor 130 when a focal point meets the hyperfocal distance is Dh, and the distance between the main lens 110 and the image sensor 130 when a focal point meets the closest focusing distance is Dc, the distance between the main lens 110 and the image sensor 130 may be changed by 19 steps in a DOF unit between Dh and Dc. Likewise, when a size of the CoC is set as two pitches of the micro lens 121, the DOF is 19.712 μm, and thus the total number of steps for the focus bracketing operation is calculated as 184.1 μm/19.712 μm=9.4. Therefore, the focus bracketing operation may have a total of 10 steps including the initial location. That is, the distance between the main lens 110 and the image sensor 130 may be changed by 10 steps in a DOF unit between Dh and Dc.

Figure 12:
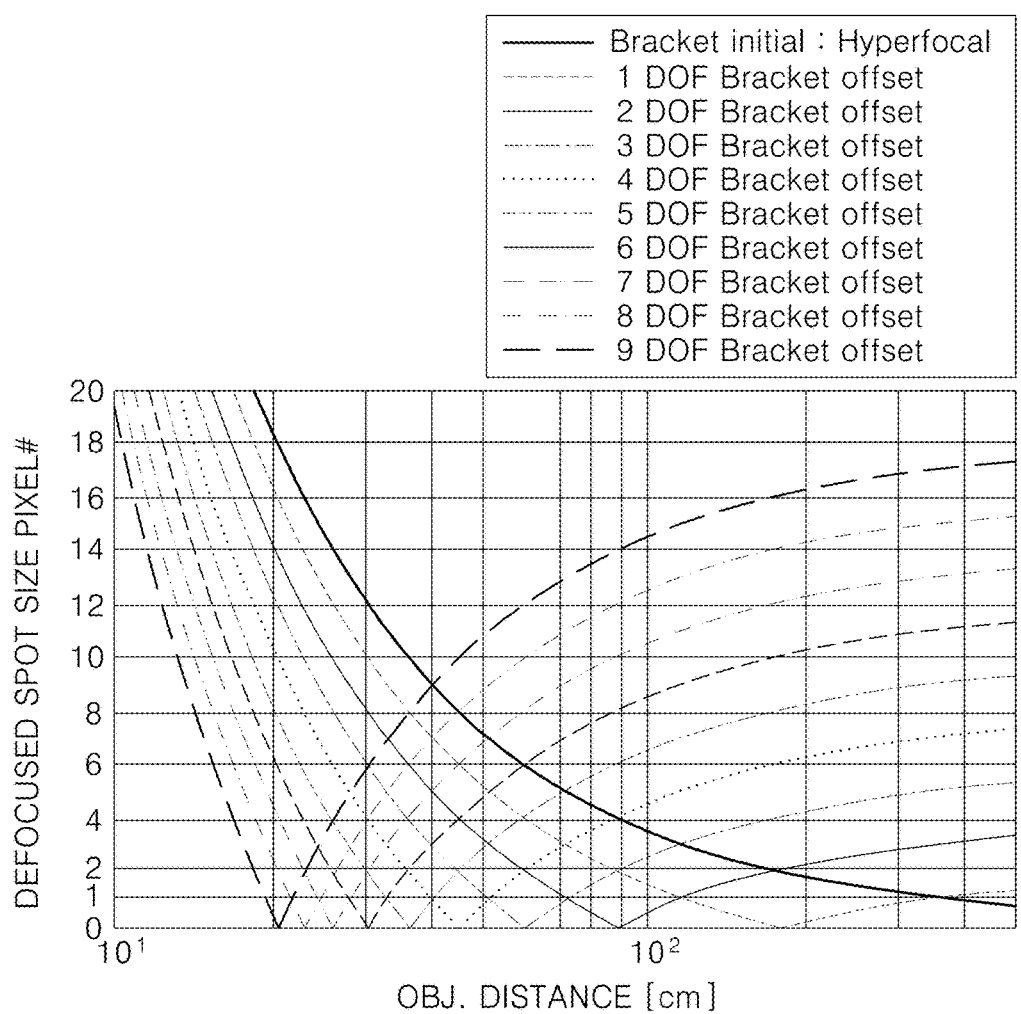
FIG. 12 is a graph showing a light spot size when an object is focused on an image sensor according to an object distance in a case where a size of the CoC is set as one pitch of a micro lens.

FIG. 12 is a graph showing a light spot size when an object is focused on the image sensor 130 according to an object distance in a case where a size of the CoC is set as one pitch of the micro lens 121. In the graph of FIG. 12, the vertical axis indicates a light spot size that is converted into a unit pixel size (i.e., pitch of the micro lens 121) of a color image, and it is assumed that a size of a light spot is equal to a size of a zero pixel when ideal light beams without considering the diffraction limitation are condensed to a focal point location. In addition, the graph of FIG. 12 was obtained by performing a focus bracketing operation having 10 steps from a location of which a distance is 5 m to the closest focusing distance that is 20 cm.

Referring to the graph of FIG. 12, at an initial location of focus bracketing, sizes of light spots made by objects located from the infinite distance to the hyperfocal distance are within a size of one unit pixel of a color image. A size of a light spot made by an object located at a closer distance than the hyperfocal distance is larger than the size of one unit pixel of the color image, resulting in the occurrence of blur. Therefore, an image in which an object located at a distance farther than the hyperfocal distance is in focus may be obtained at the initial location of focus bracketing.

A second focus bracketing (1 DOF Bracket offset) is performed at a location where the main lens 110 has moved by one DOF from the initial location of focus bracketing. Referring to FIG. 12, it may be recognized that a DOF for an object of which a size of a light spot is within the size of one unit pixel of the color image has moved. Likewise, when a location of the main lens 110 sequentially moves in a DOF unit up to "9 DOF Bracket offset", distances of objects in focus up to an object distance of 20 cm are continuously maintained. Therefore, when focus bracketing is performed in a DOF unit, images in which all objects located from the infinite distance to the closest focusing distance are respectively in focus may be obtained.

The hyperfocal distance that is the initial location of focus bracketing is (focal length×focal length)/(F number×CoC). For example, when the focal length of the main lens is 4.2 mm and the F number is 2.2, if a size of the CoC is set as one pitch of the micro lens 121, the hyperfocal distance may be 3.6 m. Also, if a size of the CoC is set as two pitches of the micro lens 121, the hyperfocal distance may be 1.8 m. Table 1 below shows a depth of field for an object in focus at each focus bracketing step based on the graph shown in FIG. 12. As shown in Table 1, when focus bracketing is performed while sequentially changing a location of the main lens 110 in a DOF unit, in-focus images from the infinite distance to the closest focusing distance may be obtained.

TABLE 1

| Focus bracketing step | Depth of field |
| --- | --- |
| #1 (hyperfocal) | 3.6 m-∞ |
| #2 | 1.2 m-3.6 m |
| #3 | 72 cm-1.2 m |
| #4 | 52-72 cm |
| #5 | 40-52 cm |
| #6 | 33-40 cm |
| #7 | 28-33 cm |
| #8 | 24-28 cm |
| #9 | 21.5-24 cm |
| #10 | 19-21.4 cm |

Figure 13:
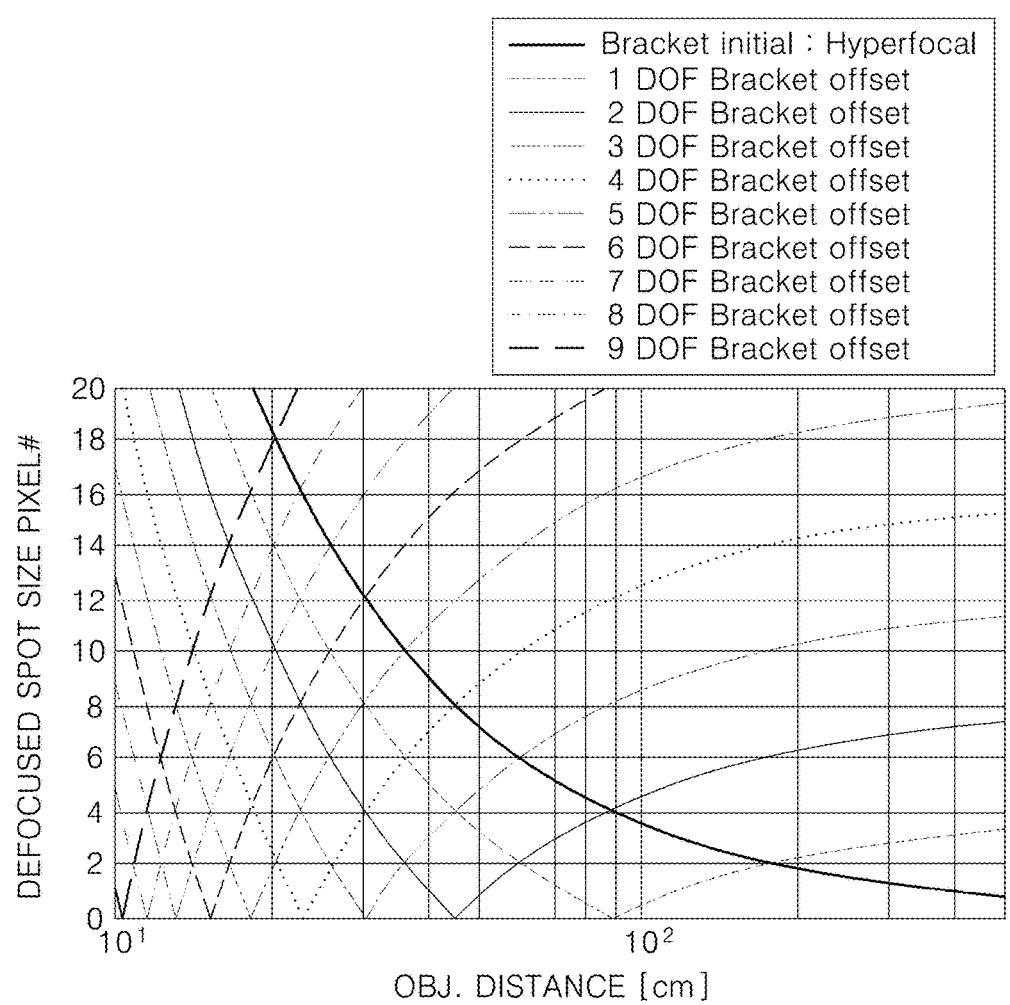
FIG. 13 is a graph showing a light spot size when an object is focused on the image sensor according to an object distance in a case where a size of the CoC is set as two pitches of a micro lens.

FIG. 13 is a graph showing a light spot size when an object is focused on the image sensor 130 according to an object distance in a case where a size of the CoC is set as two pitches of the micro lens 121. The graph of FIG. 13 is obtained in the same way or a similar way as the graph of FIG. 12, and a size of the COC is two pitches of the micro lens 121. Referring to FIG. 13, when the size of the COC is two times larger than before, the DOF increases by two times compared to the case of FIG. 12, thereby increasing a depth of field of each step.

Table 2 below shows a depth of field for an object in focus at each focus bracketing step based on the graph shown in FIG. 13. As shown in Table 2, when focus bracketing is performed while sequentially changing a location of the main lens 110 in a DOF unit, in-focus images from the infinite distance to the closest focusing distance may be obtained.

TABLE 2

| Focus bracketing step | Depth of field |
| --- | --- |
| #1 (hyperfocal) | 1.8 m-∞ |
| #2 | 60 cm-1.8 m |
| #3 | 36-60 cm |
| #4 | 26-36 cm |
| #5 | 20.3-26 cm |
| #6 | 16.7-20.3 cm |
| #7 | 14.2-16.7 cm |
| #8 | 12.3-14.2 cm |
| #9 | 10.9-12.3 cm |
| #10 | 10-10.9 cm |

The values illustrated in Tables 1 and 2 are obtained by assuming that the focal length of the main lens is 4.2 mm, the F number is 2.2, and a pitch of the micro lens 121 is 2.24 μm. However, the values are only illustrated to aid understanding, and it is understood that one or more other exemplary embodiments are not limited thereto. According to various exemplary embodiments, the focal length of the main lens, the F number, and the pitch of the micro lens 121 may vary. Regardless of the change in a design, when a focus bracketing operation is performed from the hyperfocal distance to the closest focusing distance, a location of the main lens 110 at each focus bracketing step may be changed in a DOF unit.

In Tables 1 and 2, to optimize the number of focus bracketing steps, a range recognized as in-focus in a color image is set on the basis of the CoC, and a DOF at which an image is formed within the DOF is obtained in each focus bracketing step. However, the distance information of objects in a depth map, which has been described with reference to FIGS. 8A to 8D, may be much more accurately obtained than the depth of field sections shown in Tables 1 and 2. For example, a depth value of an arbitrary object may be calculated in a sub-pixel unit by using interpolation or the like on the basis of a difference between depth value informations obtained from neighboring pixels.

Figure 14:
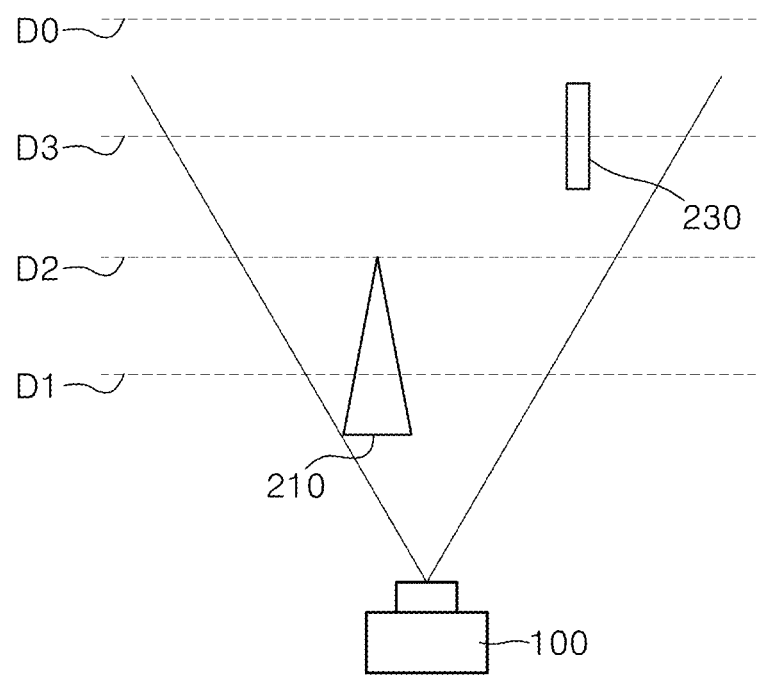
FIG. 14 illustrates an operation of performing focus bracketing for depths of field only where objects exist, in an image pickup method according to another exemplary embodiment.
Figure 15A:
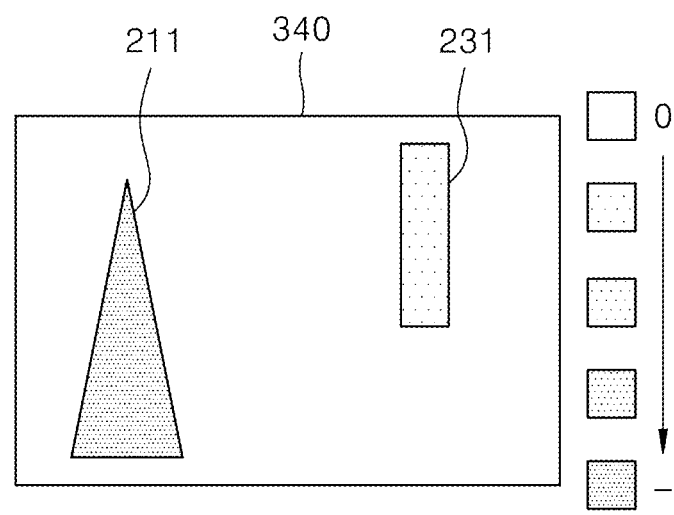
FIGS. 15A to 15C illustrate depth maps of images obtained by photographing the objects shown in FIG. 14.
Figure 15B:
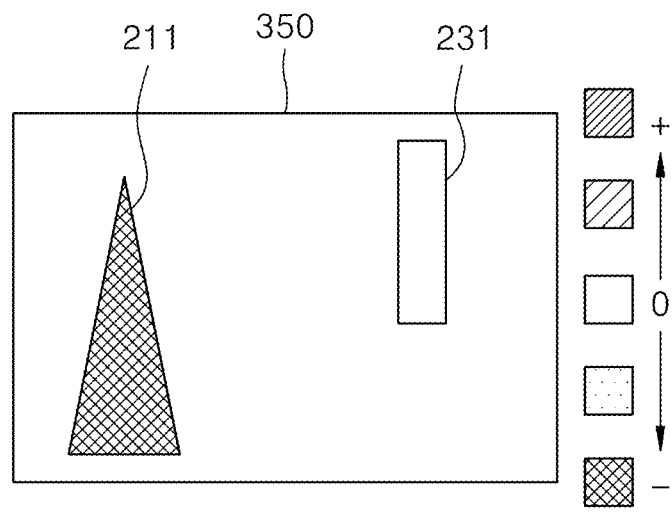
Figure 15C:
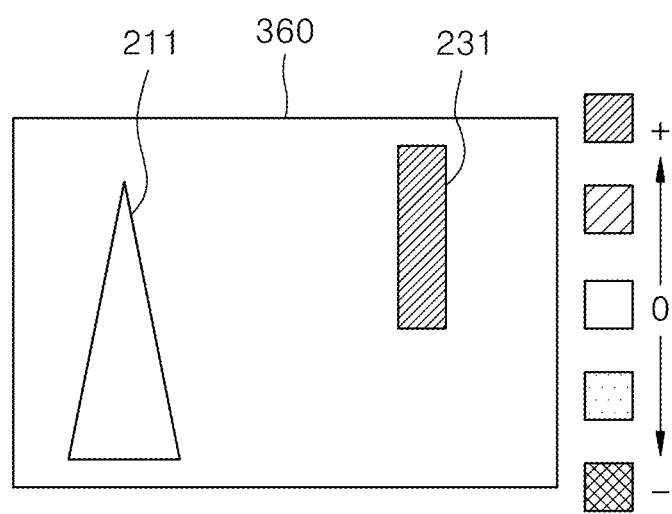

The sequential focus bracketing operation described with reference to FIGS. 9 to 13 may be applied, for example, when it is difficult to identify objects or there are too many objects within a field of view of the image pickup apparatus 100. According to another exemplary embodiment, the focus bracketing operation may be performed by adjusting focus bracketing steps only for distances at which the objects exist, for example, when the number of objects identifiable within the field of view of the image pickup apparatus 100 is small or less than a predetermined number. For example, FIG. 14 illustrates an operation of performing focus bracketing only for depths of field where objects exist, in an image pickup method according to another exemplary embodiment. In addition, FIGS. 15A to 15C illustrate depth maps of images obtained by photographing the objects shown in FIG. 14.

As shown in FIG. 14, it is assumed that the first object 210 is located at the distance D1 from the image pickup apparatus 100, and the third object 230 is located at the distance D3 from the image pickup apparatus 100. In FIG. 14, D0 denotes the hyperfocal distance. FIG. 15A shows a depth map 340 obtained when a focal point meets the hyperfocal distance. In this case, in the depth map 340, both the depth values 211 and 231 of the first and third objects 210 and 230 are negative values, respectively, and the farther a distance is from the hyperfocal distance, the greater an absolute value (i.e., magnitude) of a depth value is. FIG. 15B shows a depth map 350 obtained when the third object 230 is in focus. In this case, in the depth map 350, the depth value 231 of the third object 230 is zero (0), and the depth value 211 of the first object 210 is a negative value. FIG. 15C shows a depth map 360 obtained when the first object 210 is in focus. In this case, in the depth map 360, the depth value 211 of the first object 210 is zero (0), and the depth value 231 of the third object 230 is a positive value.

In the image pickup method according to the current exemplary embodiment, a focus bracketing operation may be performed by previously measuring a distance where an object of interest exists and skipping focus bracketing steps up to a depth of field where the object of interest exists. To this end, first, a color image is obtained by setting a focal point of the image pickup apparatus 100 to the hyperfocal distance, and the depth map 340 shown in FIG. 15A is generated from the color image. According to one or more other exemplary embodiments, the initial color image may be obtained by setting the focal point to another distance, other than the hyperfocal distance, such as a user-set distance, a predetermined distance, or an arbitrary distance. The controller 140 calculates a distance between the first object 210 and the third object 230 by analyzing the depth map 340 and checks whether the first object 210 and the third object 230 exist within one DOF range for simultaneous focusing.

If the first object 210 and the third object 230 are separated from each other by a distance at which simultaneous focusing cannot be performed, a focus bracketing step is performed for each of the first object 210 and the third object 230. For example, a color image and the depth map 350 shown in FIG. 15B are obtained by performing a focus bracketing step at a depth of field where the third object 230 is in focus, which may be determined using the initial depth map, e.g., the depth map 340 generated when the focal point is set to the hyperfocal distance. Thereafter, a color image and the depth map 360 shown in FIG. 15C are obtained by performing a focus bracketing step at a depth of field where the first object 210 is in focus. In this way, the focus bracketing may end after the focus bracketing steps are performed for the first object 210 and the third object 230.

Unlike the method shown in FIG. 9 by which focus bracketing steps are sequentially performed in a DOF unit for objects from the infinite distance to the closest focusing distance, according to the method shown in FIG. 14, after first performing a focus bracketing step for a first distance, e.g., the hyperfocal distance, a focus bracketing step is performed only for locations where objects actually exist. However, in the method shown in FIG. 14, each focus bracketing step is also performed in a DOF unit as well as the method shown in FIG. 9. Therefore, while each focus bracketing step is performed, a focal point location of the main lens 110 may move by one DOF interval or an interval of integer times the DOF. For example, when it is assumed that a distance between the image pickup apparatus 100 and the first object 210 is 50 cm, and a distance between the image pickup apparatus 100 and the third object 230 is 1.5 m, according to the method shown in FIG. 14, when the example of Table 1 is referred to, only the focus bracketing step for the hyperfocal distance, the #2 focus bracketing step, and the #5 focus bracketing step may be performed.

According to the method shown in FIG. 14, when the number of objects is small, or no objects exist within some depth of field ranges, the efficiency of a focus bracketing operation may increase. For example, when an object closest to the image pickup apparatus 100 is 50 cm away from the image pickup apparatus 100, the focus bracketing operation may end after only performing up to the #5 focus bracketing step according to the example of Table 1. Particularly, as shown in Tables 1 and 2, as objects are closer to the image pickup apparatus 100, a depth of field range is narrowed, and the number of focus bracketing steps for obtaining in-focus images increases. Therefore, by previously determining whether objects exist at close distances and skipping focus bracketing steps if no objects exist at the close distances, the efficiency of the focus bracketing operation may increase.

The focus bracketing operation that has been described may be performed by the controller 140 controlling the driver 141 and the actuator 115 to move the main lens 110. In addition, the controller 140 may determine whether all focus bracketing steps are sequentially performed according to the method shown in FIG. 9 or some focus bracketing steps are performed by skipping the other focus bracketing steps according to the method shown in FIG. 14 after the initial focus bracketing step for the hyperfocal distance is performed.

For example, when a color image and a depth map obtained by performing the initial focus bracketing step are analyzed, if objects exist in all the depth of field ranges illustrated in Table 1 or 2, or it is difficult to specify or identify objects, all the focus bracketing steps may be sequentially performed according to the method shown in FIG. 9. As another example, when objects exist only at some depth of field ranges illustrated in Table 1 or 2, only some focus bracketing steps may be performed by skipping the other focus bracketing steps according to the method shown in FIG. 14. In this case, the objects may be automatically detected, e.g., from an initial image.

According to another exemplary embodiment, when the user selects an object of interest from an image (e.g., color image) obtained by performing the initial focus bracketing step, a focus bracketing step may be performed for only the selected object according to the method shown in FIG. 14.

In this case, an initial image (e.g., color image) may be obtained and/or output by setting a focal point of the image pickup apparatus 100 to a user-set focal point, an arbitrary focal point, or a predetermined focal point (e.g., to the hyperfocal distance). From the initial image, the user may select one or more objects of interests or object regions, and one or more focus bracketing steps may be performed for only the selected one or more objects of interest. In this case, the one or more focus bracketing steps corresponding to the selected one or more objects may be determined using a depth map generated from the initial image. In the present exemplary embodiment, the image pickup apparatus 100 may further include, to receive the user selection, a user input device, such as at least one of a touchscreen, a keyboard, one or more buttons, a rotatable dial, a microphone, a switch, a joystick, a track pad, a mouse, etc.

Regarding the embodiment described with reference to FIGS. 9 to 13, all focus bracketing steps are sequentially performed regardless of whether objects exist in an image. Regarding the embodiment described with reference to FIGS. 14 and 15A to 15C, focus bracketing steps are performed only for a depth of field ranges wherein objects exist in order to improve an efficiency of a focus bracketing operation. However, even in the case of the embodiment described with reference to FIGS. 14 and 15A to 15C, focus bracketing steps may be performed for all depths of field ranges wherein objects exist, and thus, the number of focus bracketing steps to be performed may be large according to circumstances.

To further improve the efficiency of a focus bracketing operation, focus bracketing steps may be performed only for some depths of field ranges wherein objects of interest exist. For example, when the user selects objects of interest from a color image obtained by performing the initial focus bracketing step, focus bracketing steps may be performed only for the selected objects of interest according to the method shown in FIG. 14.

Figure 16:
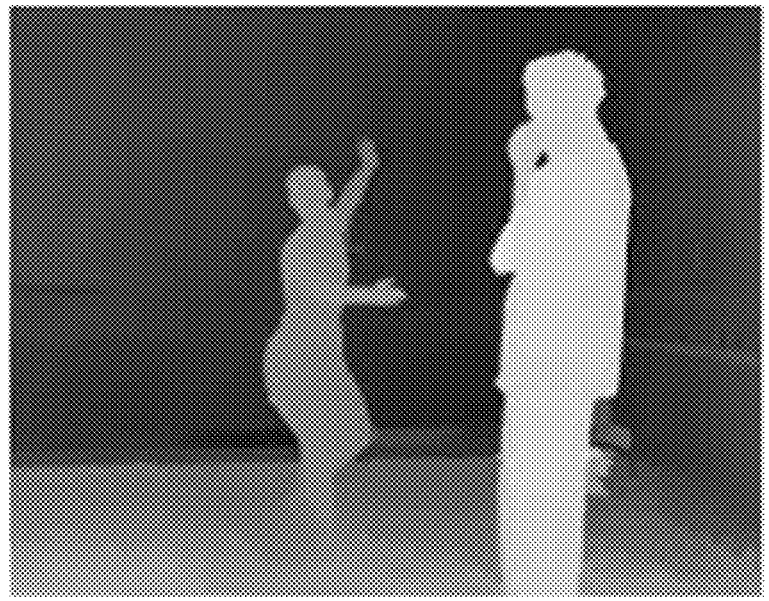
FIG. 16 illustrates a depth map of an image having two objects in the center.

In addition, an operation of selecting objects may be automatically performed. For example, FIG. 16 illustrates a depth map of an image having two objects in the center, the image being obtained by setting a focal point of the image pickup apparatus 100 at a hyperfocal distance. As shown in FIG. 16, fields corresponding to a background have relatively uniform depth values, and fields corresponding to the bottom have gradually changing depth values. Also, regions where the two objects are in the center have depth values which clearly differ from the depth values of a background region. An object having the same or a similar depth value as or to that of the background region may exist in the image, but if an object having a clearly different depth value from the depth values of the background region exists in the image, a photographer may be more interested in the object having the clearly different depth value from the depth values of the background region. In addition, it may also be generally determined that regions in which depth values gradually vary are not regions of interest to the photographer.

Accordingly, the number of focus bracketing steps may be minimized by determining objects of interest to the photographer and performing a focus bracketing operation on a depth range of the objects of interest. In addition, to further reduce the number of focus bracketing steps, only some objects of interest may be selected from among a plurality of objects of interest according to preference of a user, and the focus bracketing operation may be performed only for the selected objects of interest. Thus, the number of computations of a processor and the consumption of power and memory due to the focus bracketing operation of the image pickup apparatus 100 may be reduced.

Figure 17:
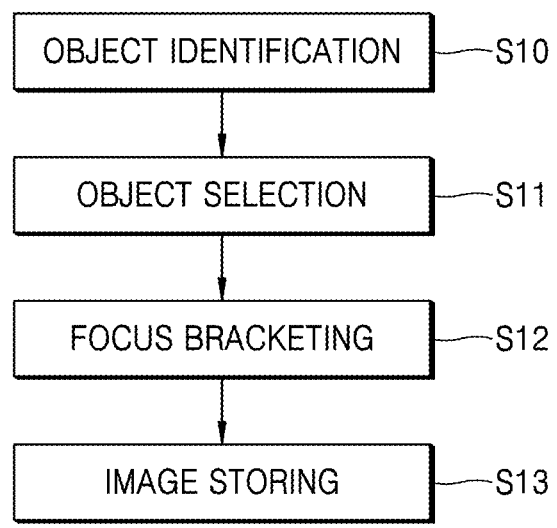
FIG. 17 illustrates a flowchart of a process of automatically selecting objects of interest and performing a focus bracketing operation only for depths of fields wherein the selected objects of interest exist.

In detail, FIG. 17 illustrates a flowchart of a process of automatically selecting objects of interest and performing a focus bracketing operation only for depths of field where the selected objects of interest exist. Referring to FIG. 17, in an object identification operation S10, a background and candidate objects of interest are identified through a depth map of an initial image obtained by setting a focal point of the image pickup apparatus 100 at a hyperfocal distance. For example, objects of interest that exist in regions which have depth values clearly different from those of a background region and of which depth values do not gradually vary in the initial image may be identified. For example, the objects of interest may be identified by extracting contours noticeable or standing out from the surroundings by using a saliency object detection algorithm or the like.

In an object selection operation S11, objects of interest to be photographed are selected through a focus bracketing operation from among the candidate objects of interest identified in the object identification operation S10. To this end, the control unit 140 may perceive an intention or preference of a user by previously analyzing a history of images captured by the user, the images being stored in a memory (not shown), and memorizing the analysis result in the memory or the like. For example, objects which appear the most in the captured images as identified by applying the saliency object detection algorithm on the captured images may be stored in the memory. For example, various kinds of objects, such as persons, flowers, insects, birds, and the like, in the captured images may be extracted and classified. Thereafter, the control unit 140 may select objects matching preferred objects of the user, the preferred object being stored in the memory, from among the candidate objects of interest identified in the object identification operation S10. The number of candidate objects of interest finally selected may be determined in advance according to settings of the user, e.g., within five settings. Alternatively, all objects satisfying a condition preset by the user, such as a position in the initial image or a size of the objects, may be selected as the objects of interest.

Figure 18:
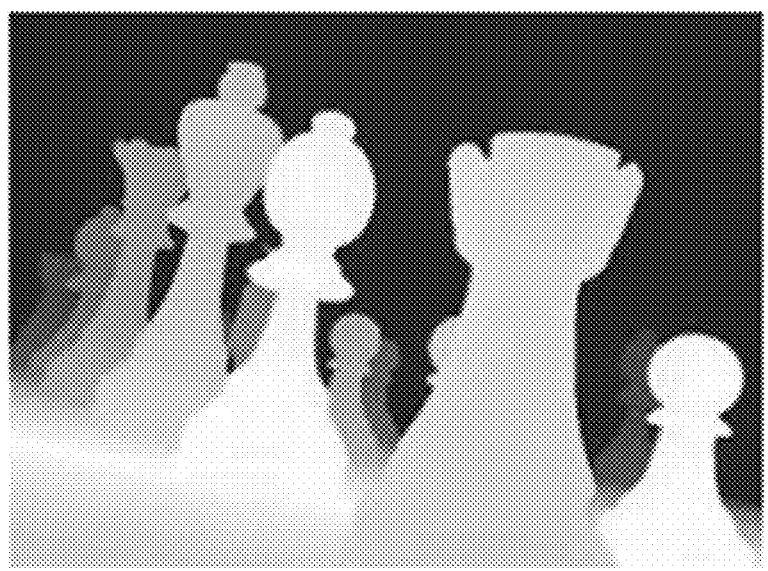
FIG. 18 illustrates a depth map of an image in which a plurality of objects of interest are evenly distributed.

In addition, when no objects of interest matching the preferred objects of the user exist, a plurality of objects of interest may be selected, for example, in an order closest to the center of the initial image or in a most distant order from among a plurality of objects of interest arranged around the center of the initial image. Alternatively, as shown in FIG. 18, when a plurality of objects of interest are evenly distributed in the whole region of the initial image, all of the objects of interest may be selected.

When the number of candidate objects of interest identified in the object identification operation S10 is only one or is less than the number of objects of interest preset by the user, the object selection operation S11 may be omitted, and all of the candidate objects of interest identified in the object identification operation S10 may be selected as the objects of interest.

In a focus bracketing operation S12, focus bracketing steps are performed only for depths of field ranges wherein the finally selected objects of interest exist by respectively using depth values of the finally selected objects of interest. In an operation S13, images captured in the respective focus bracketing steps are stored in the memory.

When a plurality of focus bracketing steps are performed, the consumption of power and memory of the image pickup apparatus 100 increases, and the processor operates frequently. Therefore, a remaining capacity of each of a battery and the memory may not be enough to perform a focus bracketing operation. Therefore, the remaining capacity of each of the battery and the memory may be checked before the focus bracketing operation, and if it is determined that the remaining capacity of each of the battery and the memory is not enough, the number of focus bracketing steps may be reduced.

Figure 19:
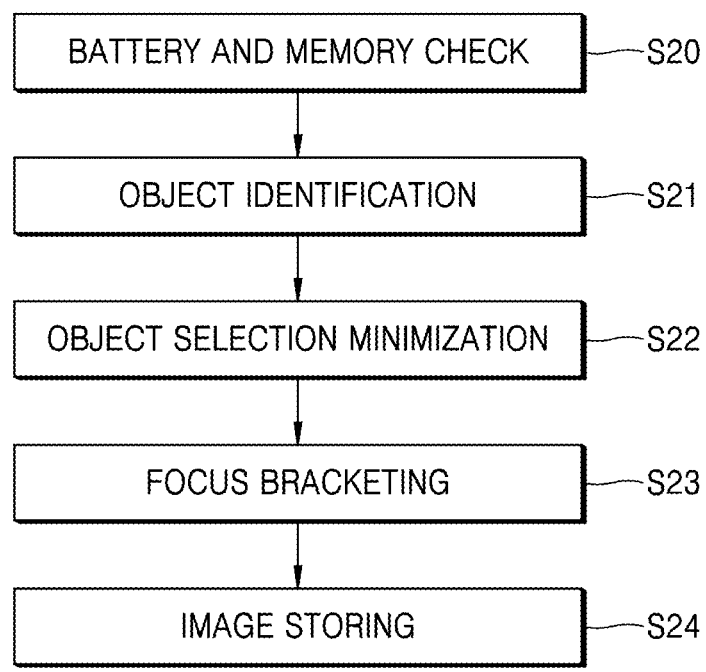
FIG. 19 illustrates a flowchart of a process of automatically selecting only core objects and performing a focus bracketing operation only for depths of fields wherein the selected core objects exist in order to minimize a focus bracketing step.

For example, FIG. 19 illustrates a flowchart of a process of automatically selecting only core objects and performing a focus bracketing operation only for depths of fields wherein the selected core objects exist in order to minimize a focus bracketing step. Referring to FIG. 19, in battery and memory check operation S20, a remaining capacity of each of the battery and the memory of the image pickup apparatus 100 is checked. If it is determined that the remaining capacity of each of the battery and the memory is enough to perform the focus bracketing operation, the focus bracketing operation may be performed according to the process shown in FIG. 17. However, if it is determined that the remaining capacity of each of the battery and the memory is not enough to perform the focus bracketing operation, the focus bracketing operation shown in FIG. 19, i.e., operations S21 to S24, may be performed.

An object identification operation S21 may be the same as the object identification operation S10 described with reference to FIG. 17. An object selection minimization operation S22 is performed according to the same algorithm as the object selection operation S11 described with reference to FIG. 17, but the number of finally selected objects of interest is restricted to, for example, one or two according to settings of the user. For example, when a plurality of candidate objects of interest exist, one or two objects of interest closest to the center of the initial image may be selected from among the plurality of candidate objects of interest according to settings of the user or one or two largest objects of interest may be selected. When the number of candidate objects of interest identified in the object identification operation S10 is merely one or two, the object selection operation S11 may be omitted, and all of the candidate objects of interest identified in the object identification operation S10 may be selected as objects of interest.

In a focus bracketing operation S23, focus bracketing steps are performed only for depths of field ranges wherein the finally selected objects of interest exist by respectively using depth values of the finally selected objects of interest. In an operation S24, images captured in the respective focus bracketing steps are stored in the memory.

As described above, according to one or more exemplary embodiments, an image pickup apparatus includes a micro lens array disposed between a main lens and an image sensor. One micro lens in the micro lens array may correspond to two or more pixels or four or more pixels in the image sensor. In addition, the image pickup apparatus may obtain a plurality of images having different depths of field by moving the main lens and may extract depth information from each of the obtained images. According to the image pickup apparatus and the image pickup method according to one or more exemplary embodiments, since a plurality of images having different viewpoints may be obtained by performing capturing a plurality of different times by changing a location of a lens, the size of the lens does not have to increase to increase the number of images having different viewpoints. Therefore, a decrease in the resolution of an image may be prevented by minimizing the size of a micro lens without decreasing the number of images having different viewpoints.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatus 100 can include circuitry, a processor, a microprocessor, etc., and may execute a computer program stored in a computer-readable medium.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:

1. An image pickup apparatus comprising:
a main lens configured to refract incident light;
an image sensor comprising a plurality of two-dimensional (2D)-arranged pixels configured to sense the incident light and to output an image signal according to the sensed incident light;
a micro lens array between the main lens and the image sensor and comprising a plurality of 2D-arranged micro lenses; and
a controller configured to receive the image signal from the image sensor and to generate an image according to the received image signal,
wherein the controller is configured to capture, with the image sensor, a plurality of images having different depths of field by changing a distance between the main lens and the image sensor and to obtain at least one depth map, respectively corresponding to at least one of the captured plurality of images, from the at least one of the captured plurality of images,
wherein the controller is configured to capture, with the image sensor, a first image by initially setting the distance between the main lens and the image sensor to focus on a predetermined distance, and to obtain a depth map from the captured first image;
wherein, in response to an object being selected using the depth map, the controller is configured to capture, with the image sensor, a second image in which the selected object is focused by adjusting, using the obtained depth map, the distance between the main lens and the image sensor to focus on the selected object, and
wherein the second image is captured with the image sensor after the depth map is obtained from the captured first image.

2. The image pickup apparatus of claim 1, wherein the predetermined distance is a hyperfocal distance.

3. The image pickup apparatus of claim 1, wherein the object is selected by a user input.

4. The image pickup apparatus of claim 1, wherein each of the plurality of 2D-arranged micro lenses respectively corresponds to at least two pixels in the image sensor.

5. The image pickup apparatus of claim 4, wherein the controller is configured to obtain a depth map by using outputs of at least two pixels corresponding to a same micro lens, among the plurality of 2D-arranged micro lenses, and to generate an image by combining the outputs of the at least two pixels corresponding to the same micro lens.

6. The image pickup apparatus of claim 1, wherein the controller is configured to change the distance between the main lens and the image sensor according to a depth of focus (DOF) unit.

7. The image pickup apparatus of claim 6, wherein the controller is configured to respectively capture in-focus images for all objects located between an infinite distance and a closest focusing distance by, each time the distance between the main lens and the image sensor is changed according to the DOF unit, capturing an image through the image sensor and obtaining a depth map.

8. The image pickup apparatus of claim 7, wherein the controller is configured to determine an object region where a depth value is a minimum in each depth map generated each time the distance between the main lens and the image sensor is changed according to the DOF unit.

9. The image pickup apparatus of claim 8, wherein, in response to an object region being selected from the plurality of images, the controller is configured to select a depth map of which a depth value in the selected object region is a minimum and to output an image corresponding to the selected depth map.

10. The image pickup apparatus of claim 6, wherein the controller is configured to change the distance between the main lens and the image sensor according to the DOF unit between Dh and Dc, where the distance between the main lens and the image sensor when focusing on a hyperfocal distance is Dh, and the distance between the main lens and the image sensor when focusing on a closest focusing distance is Dc.

11. The image pickup apparatus of claim 10, wherein the controller is configured to sequentially change the distance between the main lens and the image sensor according to the DOF unit until the distance between the main lens and the image sensor becomes Dc after initially setting the distance between the main lens and the image sensor as Dh.

12. The image pickup apparatus of claim 10, wherein the controller is configured to capture an image and obtain a depth map by initially setting the distance between the main lens and the image sensor as Dh and to adjust the distance between the main lens and the image sensor according to the DOF unit by analyzing the depth map so that an image is captured only for a depth of field where an object exists, and
wherein the controller is configured to refrain from capturing images corresponding to depths of focus where an object does not exist.

13. The image pickup apparatus of claim 6, wherein the DOF is determined as 2×(an aperture ratio of the main lens)×(a circle of confusion (CoC)), and a size of the CoC may be equal to one or two pitches of a micro lens among the plurality of 2D-arranged micro lenses.

14. The image pickup apparatus of claim 6,
wherein the controller is configured to identify a background and candidate objects of interest in the first image based on the depth map of the first image picked up by focusing at a hyperfocal distance, to select objects of interest according to a predetermined condition from among the identified candidate objects of interest, and to perform photographing for a depth of field range,
wherein each of the selected objects of interest exists based on a depth value of each of the selected objects of interest, and
wherein the controller is configured to refrain from performing photographing for a depth of field range wherein the selected objects of interest do not exist.

15. The image pickup apparatus of claim 14, wherein the controller is configured to adjust a number of selected objects of interest according to a remaining capacity of each of a battery and a memory.

16. An image pickup method of an image pickup apparatus comprising a main lens, an image sensor, and a micro lens array between the main lens and the image sensor and comprising a plurality of two-dimensional (2D)-arranged micro lenses, the image pickup method comprising:
capturing, with the image sensor, a plurality of images having different depths of field by changing a distance between the main lens and the image sensor; and
obtaining at least one depth map, respectively corresponding to at least one of the captured plurality of images, from the at least one of the captured plurality of images,
wherein the obtaining the at least one depth map comprises obtaining a depth map from a first image;
wherein the capturing the plurality of images comprises:
capturing, with the image sensor, the first image by initially setting the distance between the main lens and the image sensor to focus on a predetermined distance, and
in response to an object being selected using the depth map, capturing, with the image sensor, a second image in which the selected object is focused by adjusting, using the obtained depth map, the distance between the main lens and the image sensor to focus on the selected object; and
wherein the second image is captured with the image sensor after the depth map is obtained from the captured first image.

17. The image pickup method of claim 16, wherein the predetermined distance is a hyperfocal distance.

18. The image pickup method of claim 16, wherein the object is selected by a user input.

19. The image pickup method of claim 16, wherein each of the plurality of 2D-arranged micro lenses respectively corresponds to at least two pixels in the image sensor.

20. The image pickup method of claim 19, further comprising:
obtaining a depth map by using outputs of at least two pixels corresponding to a same micro lens, among the plurality of 2D-arranged micro lenses; and
generating an image by combining the outputs of the at least two pixels corresponding to the same micro lens.

21. The image pickup method of claim 16, wherein the distance between the main lens and the image sensor is changed according to a depth of focus (DOF) as a step unit.

22. The image pickup method of claim 21, wherein the capturing the plurality of images comprises capturing in-focus images for all objects located from an infinite distance to a closest focusing distance by, each time the distance between the main lens and the image sensor is changed according to the DOF unit, capturing an image and obtaining a depth map.

23. The image pickup method of claim 22, further comprising determining an object region where a depth value is a minimum in each depth map generated each time the distance between the main lens and the image sensor is changed according to the DOF unit.

24. The image pickup method of claim 23, further comprising:
selecting an object region from the plurality of images;
selecting a depth map of which a depth value in the selected object region is a minimum; and
outputting an image corresponding to the selected depth map.

25. The image pickup method of claim 21, wherein the distance between the main lens and the image sensor is changed according to the DOF unit between Dh and Dc, where the distance between the main lens and the image sensor when focusing on a hyperfocal distance is Dh, and the distance between the main lens and the image sensor when focusing on a closest focusing distance is Dc.

26. The image pickup method of claim 25, wherein the capturing the plurality of images comprises:
initially setting the distance between the main lens and the image sensor as Dh; and
sequentially changing the distance between the main lens and the image sensor according to the DOF unit until the distance between the main lens and the image sensor becomes Dc.

27. The image pickup method of claim 25, wherein the capturing the plurality of images comprises:
initially setting the distance between the main lens and the image sensor as Dh; and
changing the distance between the main lens and the image sensor according to the DOF unit by analyzing the depth map obtained in the initial setting of the distance so that an image is captured only for a depth of field where an object exists.

28. The image pickup method of claim 21, wherein the DOF is determined as 2×(an aperture ratio of the main lens)×(a circle of confusion (CoC)), and a size of the CoC may be equal to one or two pitches of a micro lens among the plurality of 2D-arranged micro lenses.

29. The image pickup method of claim 21, further comprising:
picking up an initial image by focusing at a hyperfocal distance;
identifying a background and candidate objects of interest in the initial image through a depth map of the picked up initial image;
selecting objects of interest according to a predetermined condition from among the identified candidate objects of interest; and
performing photographing for a depth of a field range wherein each of the selected objects of interest exists based on a depth value of each of the selected objects of interest.

30. The image pickup method of claim 29, further comprising:
checking a remaining capacity of each of a battery and a memory; and
adjusting a number of selected objects of interest according to the remaining capacity of each of the battery and the memory.

31. A refocusing method of an image pickup apparatus comprising a main lens and an image sensor, the refocusing method comprising:
capturing, with the image sensor, a plurality of images having different depths of field by changing a distance between the main lens and the image sensor;
obtaining a depth map from each of the respective captured plurality of images;
determining, for each respective depth map, an object region where a depth value in the depth map is a minimum;
after determining the object region for each respective depth map, receiving a selection from a user of a selected object region from the captured plurality of images;
selecting a depth map of which a depth value in the selected object region is a minimum; and
outputting an image corresponding to the selected depth map.

32. An image pickup apparatus comprising:
a main lens configured to refract incident light;
an image sensor comprising a plurality of two-dimensional (2D)-arranged pixels configured to sense the incident light and to output an image signal according to the sensed incident light;
a micro lens array between the main lens and the image sensor and comprising a plurality of 2D-arranged micro lenses; and
a controller configured to receive the image signal from the image sensor and to generate an image according to the received image signal,
wherein the controller is configured to capture, with the image sensor, a first image, having a first depth of field, by initially setting a distance between the main lens and the image sensor to focus on a predetermined distance, and to obtain a depth map from the captured first image,
wherein in response to an object being selected using the depth map, the controller is configured to capture, with the image sensor, a second image, having a second depth of field different from the first depth of field, in which the selected object is focused by adjusting, using the obtained depth map, the distance between the main lens and the image sensor to focus on the selected object, and
wherein the second image is captured with the image sensor after the depth map is obtained from the captured first image.

33. A refocusing method of an image pickup apparatus comprising a main lens and an image sensor, the refocusing method comprising:
capturing, with the image sensor, a first image having a first depth of field with the image sensor;
obtaining a depth map from the captured first image; and
in response to an object being selected using the depth map, capturing, with the image sensor, a second image, having a second depth of field different from the first depth of field with the image sensor, in which the selected object is focused by adjusting, using the obtained depth map, a distance between the main lens and the image sensor to focus on the selected object,
wherein the second image is captured with the image sensor after the depth map is obtained from the captured first image.

34. The image pickup apparatus of claim 1, wherein the controller is configured to select the object according to a history of images previously captured by a user.

35. The image pickup method of claim 16, wherein the object is selected according to a history of images previously captured by a user.

36. The image pickup apparatus of claim 1,
wherein the second image is captured with the image sensor after adjusting the distance between the main lens and the image sensor.

37. The image pickup method of claim 16,
wherein the second image is captured with the image sensor after adjusting the distance between the main lens and the image sensor.

\* \* \* \* \*